United States Patent
Nhan et al.

(10) Patent No.: US 12,495,449 B2
(45) Date of Patent: Dec. 9, 2025

(54) DETERMINATION FOR UPLINK REPETITIONS

(71) Applicant: Nokia Technologies Oy, Espoo (FI)

(72) Inventors: Nhat-Quang Nhan, Massy (FR); Marco Maso, Massy (FR); Karim Kasan, Massy (FR); Alessio Marcone, Munich (DE); Jing Yuan Sun, Beijing (CN); Jie Gao, Hangzhou (CN); Guillermo Pocovi, Aalborg (DK); Youngsoo Yuk, Seoul (KR); Sheyam Lal Dhomeja, Espoo (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 19/172,892

(22) Filed: Apr. 8, 2025

(65) Prior Publication Data
US 2025/0324461 A1    Oct. 16, 2025

(30) Foreign Application Priority Data
Apr. 11, 2024  (WO) ............... PCT/CN2024/087349

(51) Int. Cl.
*H04W 74/08*  (2024.01)
*H04L 5/14*  (2006.01)
(Continued)

(52) U.S. Cl.
CPC ........... *H04W 74/0833* (2013.01); *H04L 5/14* (2013.01); *H04W 72/0453* (2013.01)

(58) Field of Classification Search
CPC .. H04W 74/0833; H04W 72/0453; H04L 5/14
See application file for complete search history.

(56) References Cited

U.S. PATENT DOCUMENTS

2023/0254075 A1* 8/2023 Cozzo ............... H04L 5/001
2023/0276504 A1* 8/2023 Kim ................ H04W 74/0833
                                                              370/329
(Continued)

FOREIGN PATENT DOCUMENTS

| CN | 116567850 A | 8/2023 |
| CN | 117136610 A | 11/2023 |
| WO | 2024/031708 A1 | 2/2024 |

OTHER PUBLICATIONS

"XDD (Cross Division Duplex): Extending Coverage of 5G TDD Carriers", Standards Research Team Samsung Research, Technical White Paper, May 2021, 14 pages.
(Continued)

*Primary Examiner* — Brian D Nguyen
(74) *Attorney, Agent, or Firm* — Nokia Technologies Oy

(57) ABSTRACT

Example embodiments of the present disclosure relate to a solution for determining a set of physical random access channel (PRACH) occasions. In the solution, a first apparatus receives, from a second apparatus, configuration information indicating a plurality of PRACH occasions comprising PRACH occasions in uplink resource and PRACH occasions in sub-band non-overlapping full-duplex (SBFD) resource; determines, based on the configuration information, and for each frequency resource index for frequency multiplexed PRACH occasions, a starting PRACH occasion of a set of PRACH occasions for a PRACH transmission with preamble repetitions from the PRACH occasions in uplink resource and the PRACH occasions in SBFD resource, and performs, to the second apparatus, the PRACH transmission based at least in part on the starting PRACH occasion of the set.

19 Claims, 12 Drawing Sheets

(51) Int. Cl.
    *H04W 72/0453*      (2023.01)
    *H04W 74/0833*      (2024.01)

(56) References Cited

U.S. PATENT DOCUMENTS

| | | | |
|---|---|---|---|
| 2024/0137972 A1* | 4/2024 | Abdelghaffar | H04W 74/0833 |
| 2024/0224343 A1* | 7/2024 | Abotabl | H04L 5/14 |
| 2024/0284470 A1* | 8/2024 | Khoshnevisan | H04W 72/23 |
| 2024/0322880 A1* | 9/2024 | Noh | H04W 24/08 |
| 2024/0407010 A1* | 12/2024 | Gou | H04W 74/0833 |
| 2025/0039800 A1* | 1/2025 | Choi | H04W 52/325 |
| 2025/0080313 A1* | 3/2025 | Abotabl | H04L 5/14 |
| 2025/0089096 A1* | 3/2025 | Abotabl | H04W 74/0833 |

OTHER PUBLICATIONS

"New WID: Evolution of NR duplex operation: Sub-band full duplex (SBFD)", 3GPP TSG RAN Meeting #102, RP-234035, Agenda: 9.1.1.3, CMCC, Dec. 11-15, 2023, pp. 1-6.

"3rd Generation Partnership Project; Technical Specification Group Radio Access Network; NR; Physical layer procedures for control (Release 18)", 3GPP TS 38.213, V18.1.0, Dec. 2023, pp. 1-298.

"IEEE 802.11", Wikipedia, Retrieved on May 20, 2025, Webpage available at : https://en.wikipedia.org/wiki/IEEE_802.11.

International Search Report and Written Opinion received for corresponding Patent Cooperation Treaty Application No. PCT/CN2024/087349, dated Dec. 23, 2024, 8 pages.

"SBFD random access operation", 3GPP TSG RAN WG1 #116-bis, R1-2402926, Agenda: 9.3.2, Nokia, Apr. 15-19, 2024, 17 pages.

\* cited by examiner

DETERMINATION FOR UPLINK REPETITIONS

FIELDS

Various example embodiments of the present disclosure generally relate to the field of telecommunication and in particular, to methods, devices, apparatuses and computer readable storage medium for determining a set of physical random access channel (PRACH) occasions.

BACKGROUND

Currently, the new radio (NR) supports two duplexing modes: Frequency Division Duplex (FDD) for paired bands and Time Division Duplex (TDD) for unpaired bands. Irrespective of the duplexing mode, uplink and downlink phases are separated in time domain. This may create unnecessary latency, possibly reduce coverage and capacity depending on the considered layout. In TDD deployments, the situation is further exacerbated by the fact that the scheduling offers lower dynamism, i.e., the slot structure is fixed and does not change very often in practice. This may result in rather limited time duration for the uplink in TDD.

To address the challenges above, a study on the evolution of duplexing operation in NR has been initiated. Subband non-overlapping full duplex (SBFD) has been proposed as a scheme of an enhanced duplex operation. In the SBFD, simultaneous downlink (DL) transmission and uplink (UL) reception at a new radio (NR) NodeB (also referred to as a gNB) on different physical resource blocks (PRBs) within an unpaired wideband NR cell is allowed, while a user equipment (UE) being served by the gNB may operate in half duplex, i.e., the UE can either transmit or receive at a time instance. This duplexing scheme is also referred to as cross-division duplexing (xDD) or Flexible Duplexing (FDU). Note that this does not preclude the case when the UE operating in full duplex, i.e., the UE can transmit and receive simultaneously at a time instance.

SUMMARY

In a first aspect of the present disclosure, there is provided a first apparatus. The first apparatus comprises at least one processor; and at least one memory storing instructions that, when executed by the at least one processor, cause the first apparatus at least to: receive, from a second apparatus, configuration information indicating a plurality of physical random access channel (PRACH) occasions comprising PRACH occasions in uplink resource and PRACH occasions in sub-band non-overlapping full-duplex (SBFD) resource; determine, based on the configuration information, and for each frequency resource index for frequency multiplexed PRACH occasions, a starting PRACH occasion of a set of PRACH occasions for a PRACH transmission with preamble repetitions from the PRACH occasions in uplink resource and the PRACH occasions in SBFD resource, and perform, to the second apparatus, the PRACH transmission based at least in part on the starting PRACH occasion of the set.

In a second aspect of the present disclosure, there is provided a second apparatus. The second apparatus comprises at least one processor; and at least one memory storing instructions that, when executed by the at least one processor, cause the second apparatus at least to: transmit, to a first apparatus, configuration information indicating a plurality of physical random access channel (PRACH) occasions comprising PRACH occasions in uplink resource and PRACH occasions in sub-band non-overlapping full-duplex (SBFD) resource; monitor, based on the configuration information and for each frequency resource index for frequency multiplexed PRACH occasions, a PRACH transmission with preamble repetitions on a set of PRACH occasions for the PRACH transmission, wherein a starting PRACH occasion of the set is determined from the PRACH occasions in uplink resource, and the PRACH occasions in SBFD resource; and receive, from the first apparatus, the PRACH transmission based at least in part on the starting PRACH occasion of the set.

In a third aspect of the present disclosure, there is provided a method. The method comprises: receiving, from a second apparatus, configuration information indicating a plurality of physical random access channel (PRACH) occasions comprising PRACH occasions in uplink resource and PRACH occasions in sub-band non-overlapping full-duplex (SBFD) resource; determining, based on the configuration information, and for each frequency resource index for frequency multiplexed PRACH occasions, a starting PRACH occasion of a set of PRACH occasions for a PRACH transmission with preamble repetitions from the PRACH occasions in uplink resource and the PRACH occasions in SBFD resource, and performing, to the second apparatus, the PRACH transmission based at least in part on the starting PRACH occasion of the set.

In a fourth aspect of the present disclosure, there is provided a method. The method comprises: transmitting, to a first apparatus, configuration information indicating a plurality of physical random access channel (PRACH) occasions comprising PRACH occasions in uplink resource and PRACH occasions in sub-band non-overlapping full-duplex (SBFD) resource; monitoring, based on the configuration information and for each frequency resource index for frequency multiplexed PRACH occasions, a PRACH transmission with preamble repetitions on a set of PRACH occasions for the PRACH transmission, wherein a starting PRACH occasion of the set is determined from the PRACH occasions in uplink resource, and the PRACH occasions in SBFD resource; and receiving, from the first apparatus, the PRACH transmission based at least in part on the starting PRACH occasion of the set.

In a fifth aspect of the present disclosure, there is provided a first apparatus. The first apparatus comprises means for receiving, from a second apparatus, configuration information indicating a plurality of physical random access channel (PRACH) occasions comprising PRACH occasions in uplink resource and PRACH occasions in sub-band non-overlapping full-duplex (SBFD) resource; means for determining, based on the configuration information, and for each frequency resource index for frequency multiplexed PRACH occasions, a starting PRACH occasion of a set of PRACH occasions for a PRACH transmission with preamble repetitions from the PRACH occasions in uplink resource and the PRACH occasions in SBFD resource, and means for performing, to the second apparatus, the PRACH transmission based at least in part on the starting PRACH occasion of the set.

In a sixth aspect of the present disclosure, there is provided a second apparatus. The second apparatus comprises means for transmitting, to a first apparatus, configuration information indicating a plurality of physical random access channel (PRACH) occasions comprising PRACH occasions in uplink resource and PRACH occasions in sub-band non-overlapping full-duplex (SBFD) resource; means for monitoring, based on the configuration information and for each frequency resource index for frequency multiplexed PRACH occasions, a PRACH transmission with preamble repetitions on a set of PRACH occasions for the PRACH transmission, wherein a starting PRACH occasion of the set is determined from the PRACH occasions in uplink resource, and the PRACH occasions in SBFD resource; and means for receiving, from the first apparatus, the PRACH transmission based at least in part on the starting PRACH occasion of the set.

In a seventh aspect of the present disclosure, there is provided a computer readable medium. The computer readable medium comprises instructions stored thereon for causing an apparatus to perform at least the method according to the third aspect.

In an eighth aspect of the present disclosure, there is provided a computer readable medium. The computer readable medium comprises instructions stored thereon for causing an apparatus to perform at least the method according to the fourth aspect.

It is to be understood that the Summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Some example embodiments will now be described with reference to the accompanying drawings, where.

Figure 7:
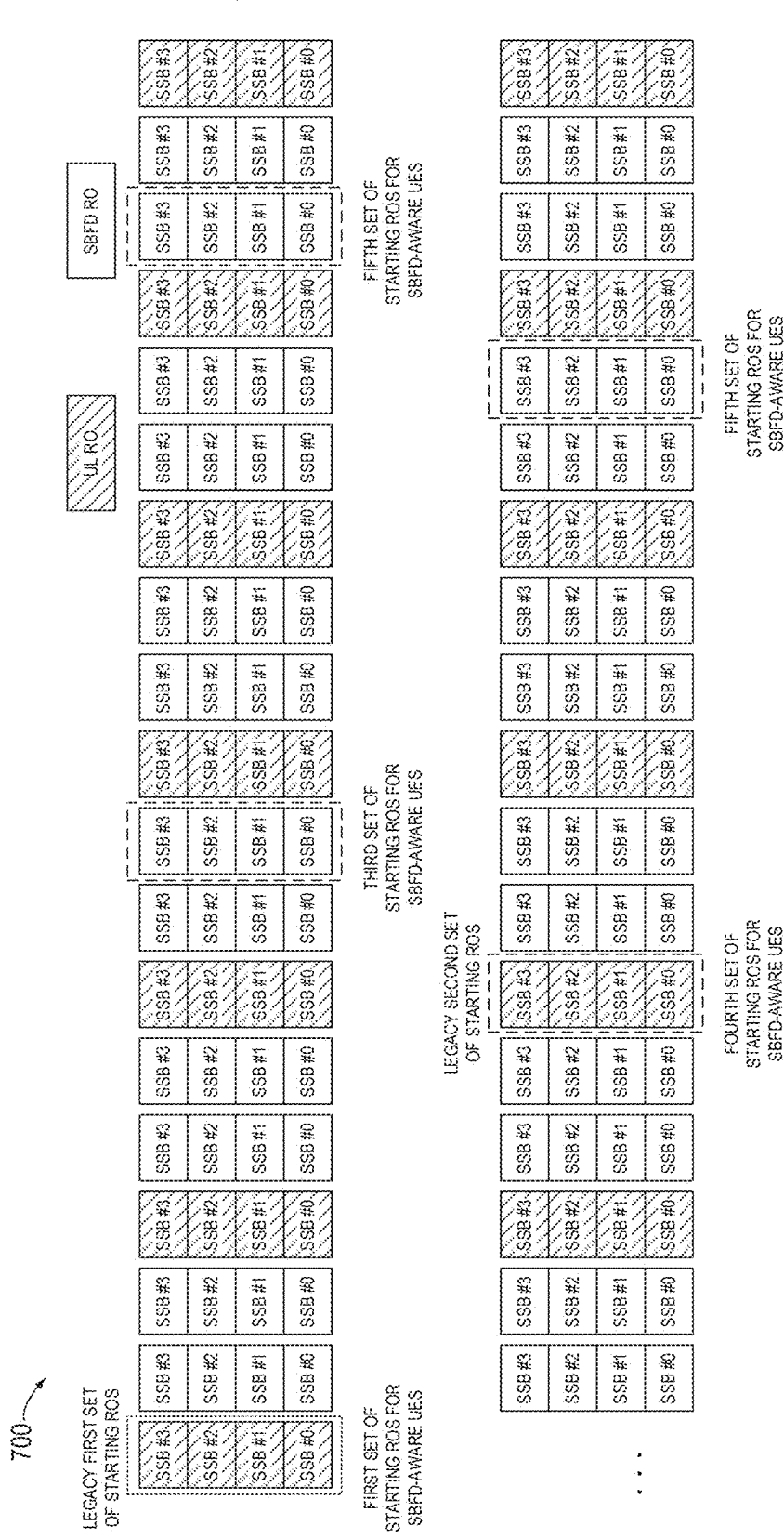
Figure 8:
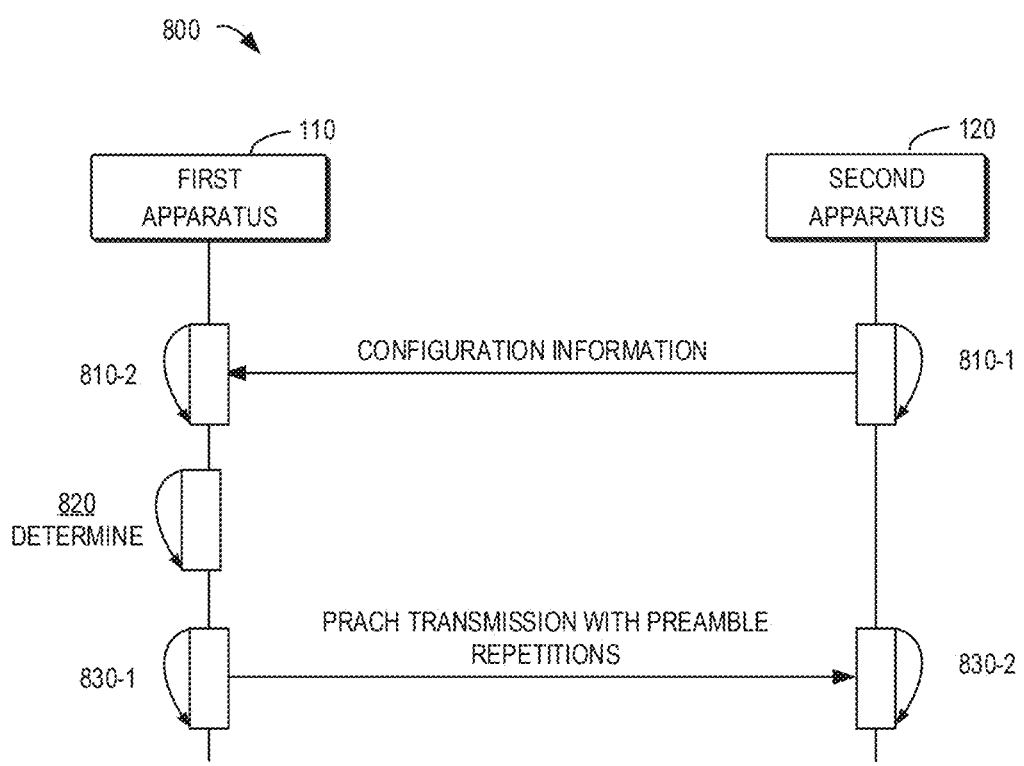
Figure 9:
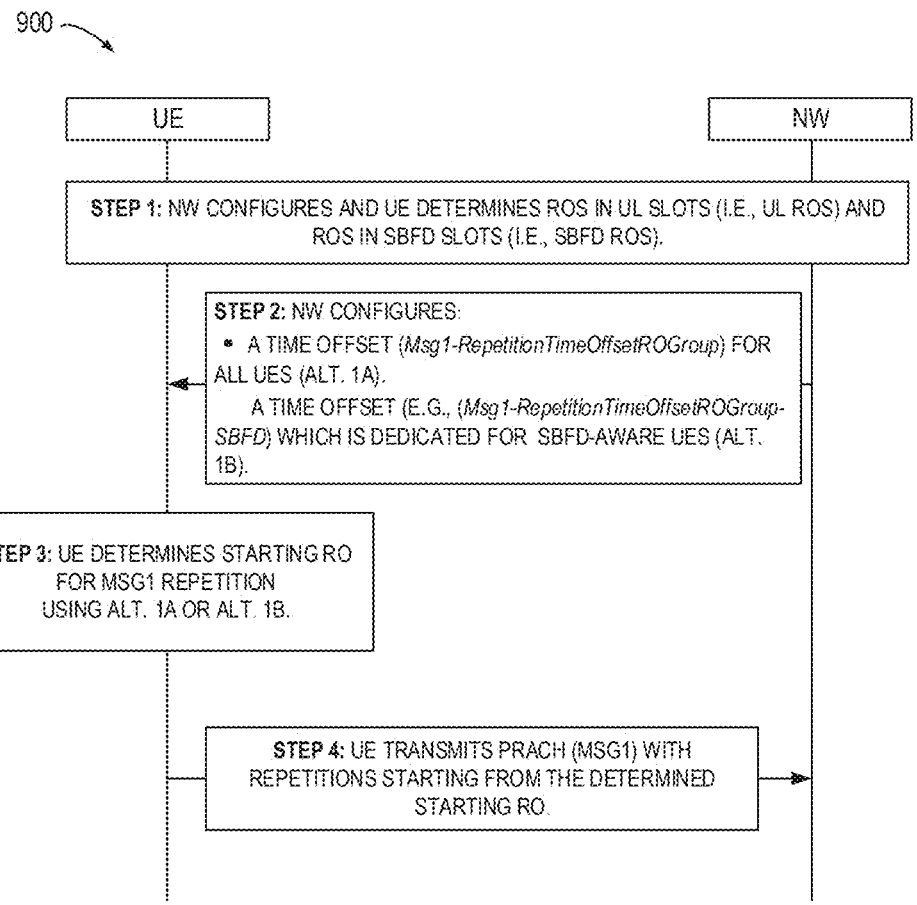
Figure 10:
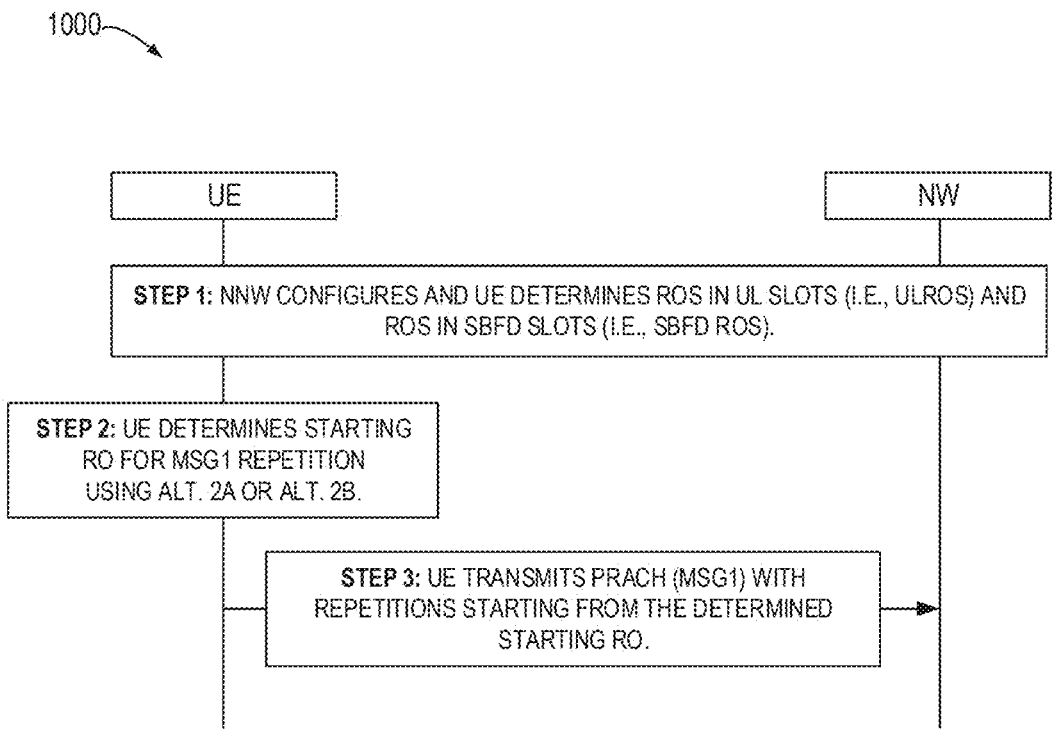
Figure 11:
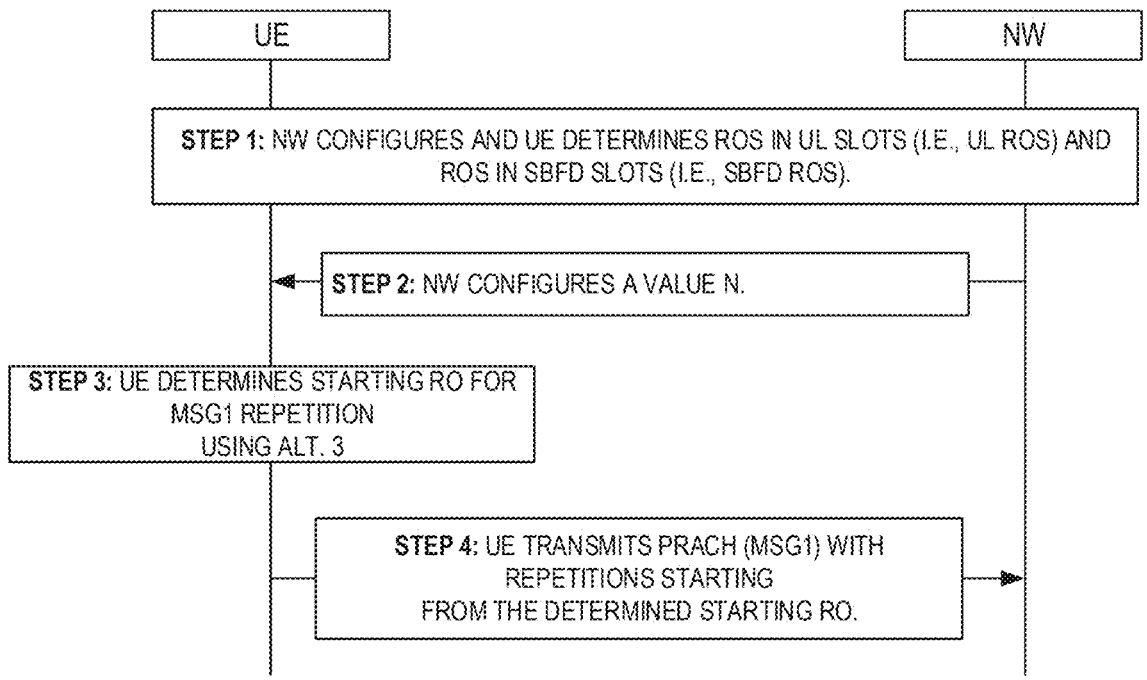
Figure 12:
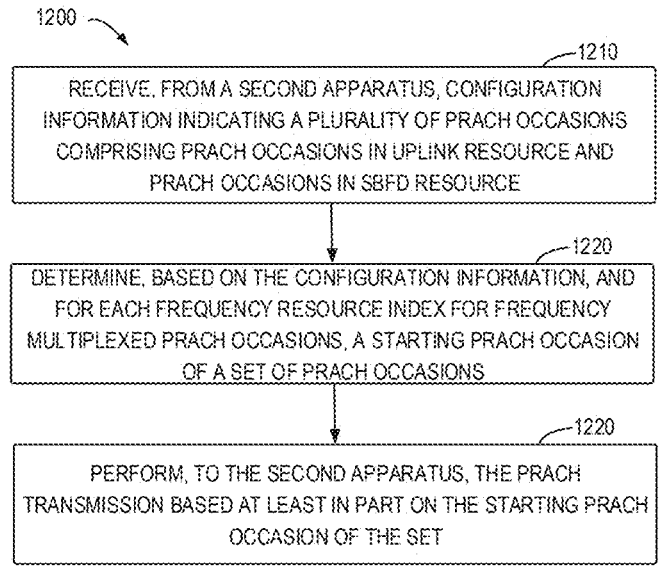
Figure 13:
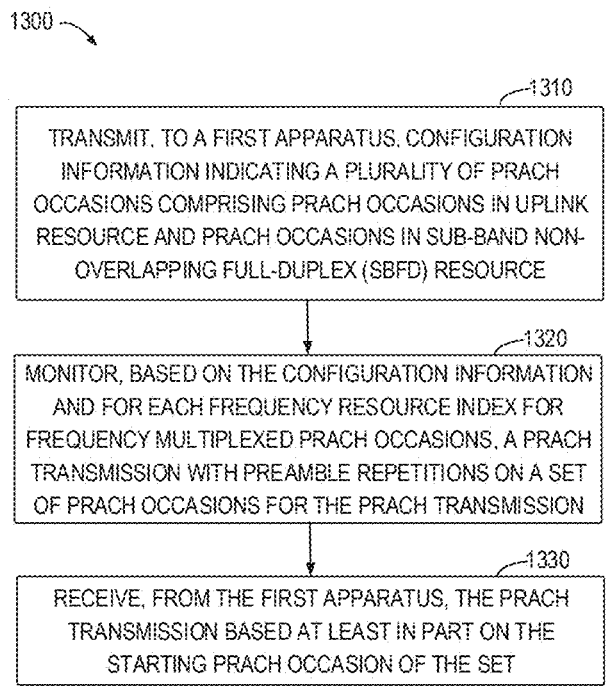
Figure 14:
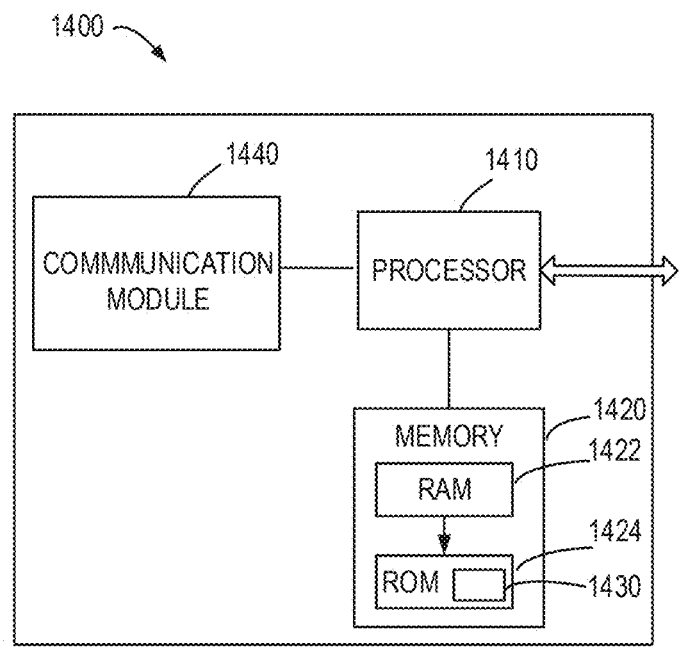
Figure 15:
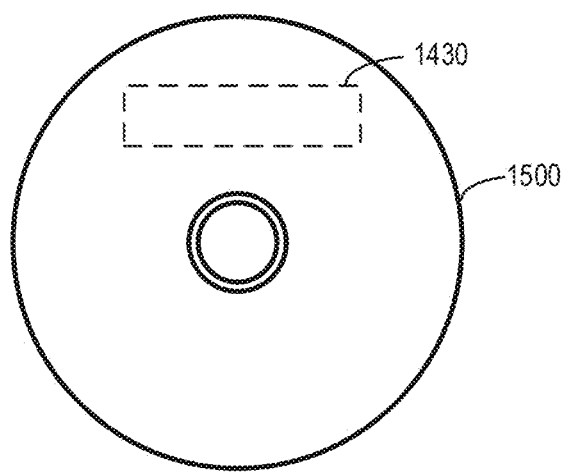

and time offset is not configured;

FIG. 7 illustrates an example of candidates for the sets of starting ROs for legacy and SBFD-aware UEs, for $$N_{preamble}^{rep} = 8$$

and time offset is 8;

FIG. 8 illustrates a signaling chart of communication according to some example embodiments of the present disclosure;

FIG. 9-11 illustrate signaling charts of communication according to some example embodiments of the present disclosure;

FIG. 12 illustrates a flowchart of a method implemented at a first apparatus in accordance with some example embodiments of the present disclosure;

FIG. 13 illustrates a flowchart of a method implemented at a second apparatus in accordance with some example embodiments of the present disclosure;

FIG. 14 illustrates a simplified block diagram of a device that is suitable for implementing example embodiments of the present disclosure; and FIG. 15 illustrates a block diagram of an example computer readable medium in accordance with some example embodiments of the present disclosure.

Throughout the drawings, the same or similar reference numerals represent the same or similar element.

DETAILED DESCRIPTION

Principle of the present disclosure will now be described with reference to some example embodiments. It is to be understood that these embodiments are described only for the purpose of illustration and help those skilled in the art to understand and implement the present disclosure, without suggesting any limitation as to the scope of the disclosure. Embodiments described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first," "second" and the like may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the listed terms.

As used herein, "at least one of the following: <a list of two or more elements>" and "at least one of <a list of two or more elements>" and similar wording, where the list of two or more elements are joined by "and" or "or", mean at least any one of the elements, or at least any two or more of the elements, or at least all the elements.

As used herein, unless stated explicitly, performing a step "in response to A" does not indicate that the step is performed immediately after "A" occurs and one or more intervening steps may be included.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

As used in this application, the term "circuitry" may refer to one or more or all of the following:
(a) hardware-only circuit implementations (such as implementations in only analog and/or digital circuitry) and
(b) combinations of hardware circuits and software, such as (as applicable):
  (i) a combination of analog and/or digital hardware circuit(s) with software/firmware and
  (ii) any portions of hardware processor(s) with software (including digital signal processor(s)), software, and memory(ies) that work together to cause an apparatus, such as a mobile phone or server, to perform various functions) and
(c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As used herein, the term "communication network" refers to a network following any suitable communication standards, such as New Radio (NR), Long Term Evolution (LTE), LTE-Advanced (LTE-A), Wideband Code Division Multiple Access (WCDMA), High-Speed Packet Access (HSPA), Narrow Band Internet of Things (NB-IoT) and so on. Furthermore, the communications between a terminal device and a network device in the communication network may be performed according to any suitable generation communication protocols, including, but not limited to, the first generation (1G), the second generation (2G), 2.5G, 2.75G, the third generation (3G), the fourth generation (4G), 4.5G, the fifth generation (5G) communication protocols, and/or any other protocols either currently known or to be developed in the future. Embodiments of the present disclosure may be applied in various communication systems. Given the rapid development in communications, there will of course also be future type communication technologies and systems with which the present disclosure may be embodied. It should not be seen as limiting the scope of the present disclosure to only the aforementioned system.

As used herein, the term "network device" refers to a node in a communication network via which a terminal device accesses the network and receives services therefrom. The network device may refer to a base station (BS) or an access point (AP), for example, a node B (NodeB or NB), an evolved NodeB (eNodeB or eNB), an NR NB (also referred to as a gNB), a Remote Radio Unit (RRU), a radio header (RH), a remote radio head (RRH), a relay, an Integrated Access and Backhaul (IAB) node, a low power node such as a femto, a pico, a non-terrestrial network (NTN) or non-ground network device such as a satellite network device, a low earth orbit (LEO) satellite and a geosynchronous earth orbit (GEO) satellite, an aircraft network device, and so forth, depending on the applied terminology and technology. In some example embodiments, radio access network (RAN) split architecture comprises a Centralized Unit (CU) and a Distributed Unit (DU) at an IAB donor node. An IAB node comprises a Mobile Terminal (IAB-MT) part that behaves like a UE toward the parent node, and a DU part of an IAB node behaves like a base station toward the next-hop IAB node.

The term "terminal device" refers to any end device that may be capable of wireless communication. By way of example rather than limitation, a terminal device may also be referred to as a communication device, user equipment (UE), a Subscriber Station (SS), a Portable Subscriber Station, a Mobile Station (MS), or an Access Terminal (AT). The terminal device may include, but not limited to, a mobile phone, a cellular phone, a smart phone, voice over IP (VoIPP) phones, wireless local loop phones, a tablet, a wearable terminal device, a personal digital assistant (PDA), portable computers, desktop computer, image capture terminal devices such as digital cameras, gaming terminal devices, music storage and playback appliances, vehicle-mounted wireless terminal devices, wireless endpoints, mobile stations, laptop-embedded equipment (LEE), laptop-mounted equipment (LME), USB dongles, smart devices, wireless customer-premises equipment (CPE), an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. The terminal device may also correspond to a Mobile Termination (MT) part of an IAB node (e.g., a relay node). In the following description, the terms "terminal device", "communication device", "terminal", "user equipment" and "UE" may be used interchangeably.

As used herein, the term "resource," "transmission resource," "resource block," "physical resource block" (PRB), "uplink resource," or "downlink resource" may refer to any resource for performing a communication, for example, a communication between a terminal device and a network device, such as a resource in time domain, a resource in frequency domain, a resource in space domain, a resource in code domain, or any other resource enabling a communication, and the like.

In the following, a resource in time domain will be used as an example of a resource for describing some example embodiments of the present disclosure. It is noted that example embodiments of the present disclosure are equally applicable to other resources in other domains. In summary, the resource used herein includes but is not limited to a time resource or a frequency resource, for example, a subband non-overlapping full duplex time resource, a dynamic time division duplexing time resource, a full duplex evolution time resource, a sub-band, a sub-carrier, or a resource element (RE).

As used herein, term "SBFD-aware UE" refers to a UE which is capable of understanding/applying a SBFD-related configuration.

As used herein, terms "PRACH occasion", "RACH occasion" and "RO" have the same physical meaning and thus may be used interchangeably.

As used herein, term "an SBFD RO" or "an RO in SBFD symbols" may refer to an RO that is fully or partially overlapped with SBFD symbol(s)/slot.

In the context of the present disclosure, a physical random-access channel (PRACH) occasion (RO) in uplink symbol(s) may be referred to as uplink RO and an RO in SBFD symbol(s) may be referred to as SBFD RO for brevity.

It is to be understood that the Msg1 in 4-step random access channel (RACH) is used as an example uplink transmission for describing some specific example embodiments of the present disclosure. However, it is straightforward to apply example embodiments related to Msg1 to the preamble/Msg1 part of MsgA in a 2-step RACH. In short, the term "Msg1" may be replaced by "MsgA", "the preamble part of MsgA" or "the Msg1 part of MsgA" unless there is a clear exclusion.

In the context of the present disclosure, an RO set may refer to at least one RO within which Msg1/preamble/MsgA is repeated. In some example embodiments, RO sets may be not configured but implicitly determined by UE within a time period given by an integer number of association pattern periods. In some example embodiments, all the ROs in a set may be mapped to the same SSB index. In some example embodiments, RO sets can occur over ROs configured for legacy PRACH or over dedicated resource. Further, RO sets for different number of repetitions can occur over the same set of ROs, i.e., different preambles are used for the different number of repetitions, or over different sets of ROs, i.e., same preambles can be used by all of them. There is no transmission postponement, i.e., if a collision occurs over one or more ROs of the set then the corresponding PRACH Tx is dropped. Each RO set for K repetitions has one starting RO and N−1 other ROs with same frequency location, i.e., same frequency resource index for all the ROs in a set. There is no power ramping within an RO set, since it is the same RACH attempt.

In the context of the present disclosure, a starting RO(s) refer to the first RO in the RO set(s). In some example embodiments, the first starting RO(s) of the first RO set in a time period are always determined as the first valid RO(s) in the time period for each frequency. All other starting RO(s) may be determined as a function of a cell-specific time offset, if configured, or are determined as the first valid RO after the last RO of the previous RO set. Further, proper cell-specific configuration should allow to fix all starting ROs positions in the time period, while "blanking" some of them using the time offset, to reduce the number of blind detection operations at gNB.

In the context of the present disclosure, an association period, starting from frame 0, for mapping SS/PBCH block indexes to PRACH occasions is the smallest integer number in the set determined by the PRACH configuration period, such that $$N_{Tx}^{SSB}$$

SS/PBCH block indexes are mapped at least once to the PRACH occasions within the association period, where a UE obtains $$N_{Tx}^{SSB}$$

from the value of ssb-PositionsInBurst in SIB1 or in ServingCellConfigCommon. If after an integer number of SS/PBCH block indexes to PRACH occasions mapping cycles within the association period there is a set of PRACH occasions or PRACH preambles that are not mapped to $$N_{Tx}^{SSB}$$

SS/PBCH block indexes, no SS/PBCH block indexes are mapped to the set of PRACH occasions or PRACH preambles. An association pattern period includes one or more association periods and is determined so that a pattern between PRACH occasions and SS/PBCH block indexes repeats at most every 160 msec. PRACH occasions not associated with SS/PBCH block indexes after an integer number of association periods, if any, are not used for PRACH transmissions.

For a PRACH transmission with $$N_{preamble}^{rep}$$

preamble repetitions, a set consists of $$N_{preamble}^{rep}$$

valid PRACH occasions that are consecutive in time, use same frequency resources, and are associated with same one or more SS/PBCH block index(es), and each SS/PBCH block index is associated with same preamble indexes in all valid PRACH occasions within the set.

For a PRACH transmission with preamble repetitions, a time period, starting from frame 0, is the smallest integer number of association pattern periods such that at least one set of valid PRACH occasions for each of the $$N_{Tx}^{SSB}$$

SS/PBCH block indexes can be determined within the time period for all configured number of preamble repetitions. The set(s) of valid PRACH occasions for each configured number of preamble repetitions repeats every time period.

Within a time period, for set(s) of $$N_{preamble}^{rep}$$

valid PRACH occasions for a PRACH transmission with $$N_{preamble}^{rep}$$

preamble repetitions,
 the first valid PRACH occasion of the first set is the first valid PRACH occasion,
 the first valid PRACH occasion of subsequent sets, if any, is determined according to an ordering of valid PRACH occasions, first, in increasing order of frequency resource indexes for frequency multiplexed PRACH occasions, second, in increasing order of time resource indexes for time multiplexed PRACH occasions.

For each frequency resource index for frequency multiplexed PRACH occasions, the first valid PRACH occasion of the first set is the first valid PRACH occasion, the first valid PRACH occasion of subsequent sets, if any,
is after TimeOffsetBetweenStartingRO consecutive valid PRACH occasions in time from the first valid PRACH occasion of the previous set, where each PRACH occasion is associated with same SS/PBCH block index(es) and each SS/PBCH block index is associated with same preambles, if TimeOffsetBetweenStartingRO is provided, is after the PRACH occasions for the previous set, if TimeOffsetBetweenStartingRO is not provided.

Example Environment

Figure 1A:
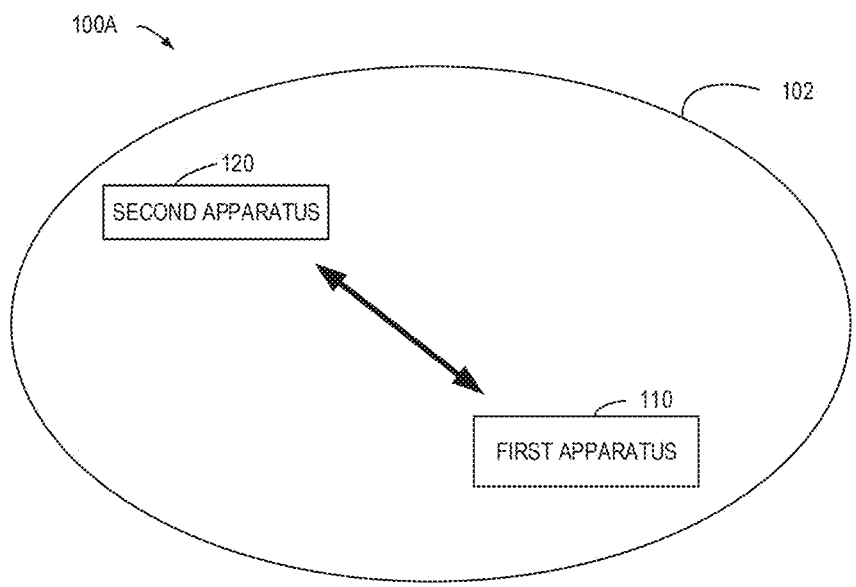
FIG. 1A illustrates an example communication environment in which example embodiments of the present disclosure can be implemented.

FIG. 1A illustrates an example communication environment 100A in which example embodiments of the present disclosure can be implemented. The communication environment 100A includes a first apparatus 110 and a second apparatus 120. A serving area provided by the second apparatus 120 is called a cell. The second apparatus 120 can provide one or more cells, for example, a cell 102 as illustrated in FIG. 1A.

In some example embodiments, the first apparatus 110 may be comprised in a terminal device and the second apparatus 120 may be comprised in a network device serving the terminal apparatus.

In the following, for the purpose of illustration, some example embodiments are described with the first apparatus 110 operating as a terminal apparatus and the second apparatus 120 operating as a network apparatus. However, in some example embodiments, operations described in connection with a terminal apparatus may be implemented at a network apparatus or other apparatus, and operations described in connection with a network apparatus may be implemented at a terminal apparatus or other apparatus.

In some example embodiments, if the first apparatus 110 is a terminal apparatus and the second apparatus 120 is a network apparatus, a link from the second apparatus 120 to the first apparatus 110 is referred to as a downlink (DL), while a link from the first apparatus 110 to the second apparatus 120 is referred to as an uplink (UL). In DL, the second apparatus 120 is a transmitting (TX) apparatus (or a transmitter) and the first apparatus 110 is a receiving (RX) apparatus (or a receiver). In UL, the first apparatus 110 is a TX apparatus (or a transmitter) and the second apparatus 120 is a RX apparatus (or a receiver).

Communications in the communication environment 100 may be implemented according to any proper communication protocol(s), comprising, but not limited to, cellular communication protocols of the first generation (1G), the second generation (2G), the third generation (3G), the fourth generation (4G), the fifth generation (5G), the sixth generation (6G), and the like, wireless local network communication protocols such as Institute for Electrical and Electronics Engineers (IEEE) 802.11 and the like, and/or any other protocols currently known or to be developed in the future. Moreover, the communication may utilize any proper wireless communication technology, comprising but not limited to: Code Division Multiple Access (CDMA), Frequency Division Multiple Access (FDMA), Time Division Multiple Access (TDMA), Frequency Division Duplex (FDD), Time Division Duplex (TDD), Multiple-Input Multiple-Output (MIMO), Orthogonal Frequency Division Multiple (OFDM), Discrete Fourier Transform spread OFDM (DFT-s-OFDM) and/or any other technologies currently known or to be developed in the future.

Figure 1B:
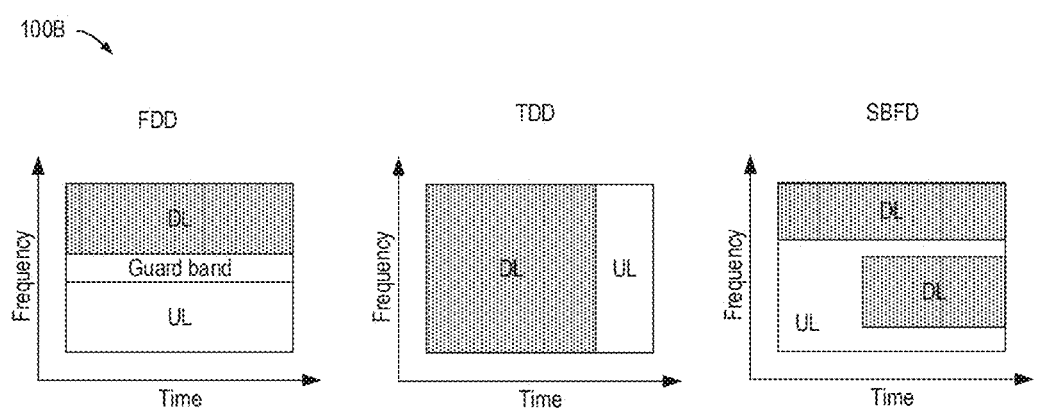
FIG. 1B illustrates a block of example duplexing modes.

Multiple duplexing modes may be supported in communication environment 100A. Reference is now made to FIG. 1B, which illustrates a block 100B of three example duplexing modes, i.e., TDD, FDD and SBFD.

The FDD may be used for paired bands and TDD may be used for unpaired bands. In TDD, the time domain resource is split between downlink and uplink. Allocation of a limited time duration for the uplink in TDD would result in reduced coverage, increased latency, and reduced capacity. The SBFD may be considered as an evolution of duplexing operation in NR. In particular, the SBFD may allow simultaneous DL and UL transmission on different physical resource blocks (PRBs)/sub-bands within an unpaired wideband NR cell, as illustrated in FIG. 1B.

Further, different duplexing modes may be used interactively. For better understanding, reference is now made to FIG. 1C, which illustrates a block 100C of SBFD resources and non-SBFD resources.

In SBFD slots, a guardband is expected to be placed between DL and UL resource blocks (RBs). This provides better isolation between UL and DL transmissions and is expected to be essential for reducing the impact of the self-interference (due to the DL transmissions od the gNB and the UL reception of the gNB) as well as cross-link interference (CLI) between UE to UE links, and gNB to gNB links.

Figure 1C:
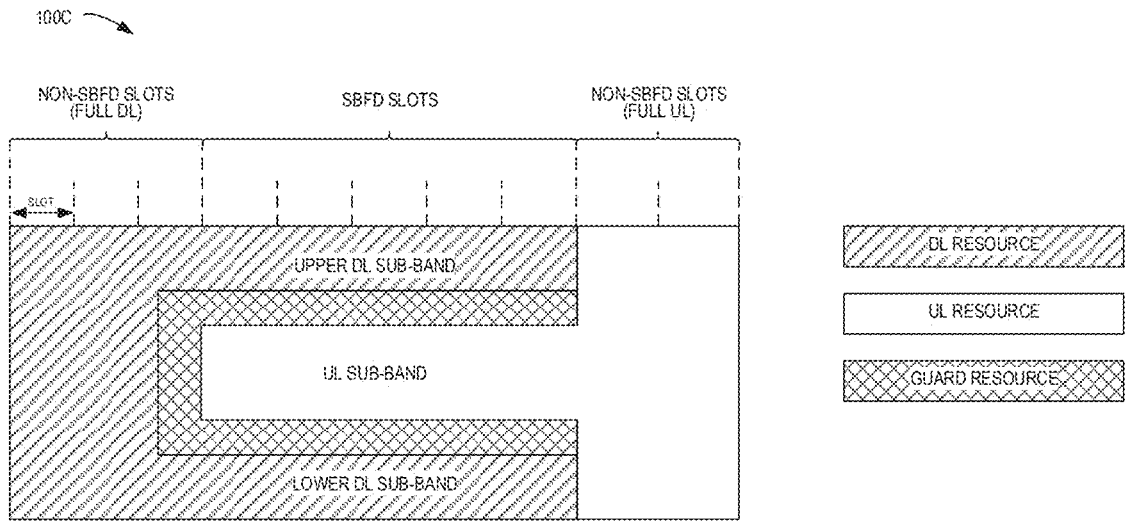
FIG. 1C illustrates a block of SBFD resources and non-SBFD resources.

In the example of FIG. 1C, it may be observed that there are two slot/symbol types exist for both DL and UL transmissions as shown in FIG. 1C, namely, SBFD slots/symbols, during which the non-overlapping DL sub-bands and UL sub-band(s) both exist, and Non-SBFD slots/symbols, during which the entire band is used for DL or UL (i.e., legacy/full DL/UL slots).

In the wireless communication system, UE needs to perform random access (RA) procedure with the network.

In 5G NR, two contention based random access (CBRA) procedures are supported, namely 4-step random access channel (RACH) (Rel-15) and 2-step RACH (Rel-16) and one contention-free random-access procedure (CFRA). A step in all these procedures is the transmission of a suitable message by the UE to NW (the nature of the message changes depending on which procedure is executed, but the first action is always for the UE).

Figure 2A:
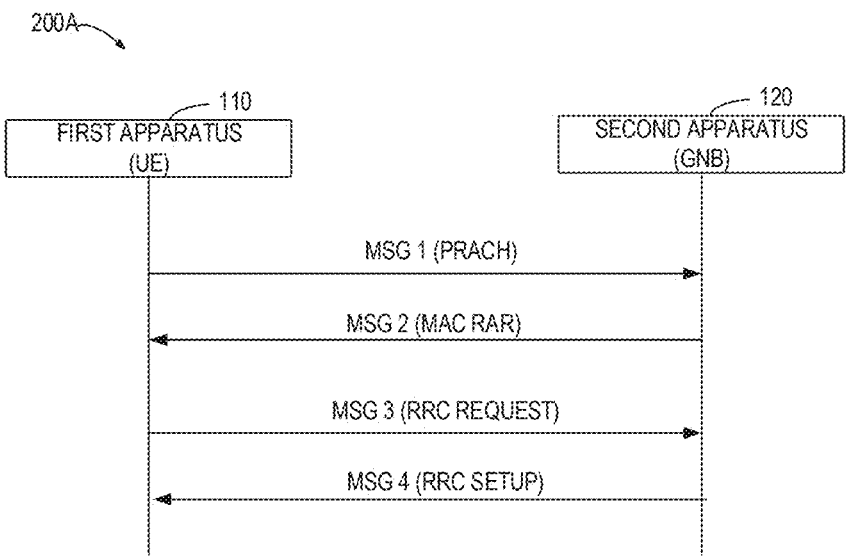
FIG. 2A illustrates a signaling chart of 4-step random access channel procedure.

As shown in FIG. 2A, the 4-step RACH procedure 200A may be summarized as follows below:

Message 1/Msg1 (also known as PRACH): The UE sends a specific preamble to the gNB via PRACH using a specific resource called RACH occasion (RO), mapped to one or more synchronization signal block (SSB) beams according to a certain pattern.

Message 2/Msg2 (also known as Random access response, RAR): The gNB replies with an RAR message, which includes the detected preamble ID, the time-advance command, a temporary cell (TC)-radio network temporary identifier (RNTI), and UL grant for the transmission of Message 3/Msg3 on physical uplink shared channel (PUSCH).

Message 3/Msg3 (also known as radio resource control (RRC) request): The UE responds to Msg2 over the scheduled PUSCH with an ID for contention resolution.

Message 4/Msg4 (also known as RRC setup): The gNB transmits the contention resolution message with the contention-resolution ID.

Upon reception of Msg4, the UE sends an acknowledgement (ACK) on a physical uplink control channel (PUCCH) if its contention-resolution ID is carried by Msg4. This completes the 4-step RACH. It is worth noting that prior to Msg1, there is also a preliminary step of sending and receiving the SSB, i.e., DL beam sweeping, which is not formally part of the RACH procedure. As a result of this preliminary step, the UE selects the index of the preferred SSB beam and decodes the associated PBCH for master information block (MIB), SIB and so on. This index is also used by UE to identify a suitable RO for the preamble transmission (Msg1), according to the SSB-to-RO mapping conveyed by SIB1.

Figure 2B:
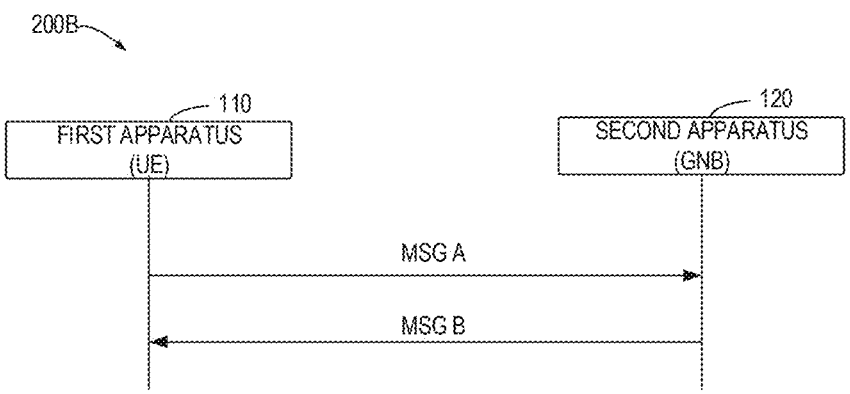
FIG. 2B a illustrates signaling chart of 2-step random access channel procedure.

FIG. 2B illustrates a 2-step RACH procedure 200B which is similar to 4-step RACH presented above. Specifically, Msg1 and Msg3 in the 4-step RACH are combined in a MsgA and sent out without waiting for feedback from the UE in between (i.e., Msg2 in the 4-step RACH). Similarly, the gNB combines Msg2 and Msg4 in the 4-step RACH into MsgB.

The mapping of SSB indexes to the determined ROs is fundamental for a UE to understand which ROs are associated to the SSB index selected during the preliminary step before the start of the RACH procedure. The different SSB indexes are beamformed in different directions in the cell, hence selection of a wrong SSB index may entail failure of the RACH procedure.

To this purpose, one fundamental parameter ssb-per-RACH-OccasionAndCB-PreamblesPerSSB is configured in RACH-ConfigCommon and indicates below information: (i) the number of SS/PBCH block indexes (or preamble sets) per RO, and (ii) the number of contention-based preambles per SS/PBCH block index (or preamble set). More precisely, for Type-1 random access procedure, a UE is provided a number N of SS/PBCH block indexes associated with one PRACH occasion and a number R of contention-based preambles per SS/PBCH block index per valid PRACH occasion by ssb-perRACH-OccasionAndCB-PreamblesPerSSB. Once this information is available to a UE, the UE maps the SSB indexes to the time-frequency grid of ROs in increasing order of frequency resource indices, time resource indices of the ROs within a PRACH slots, and the PRACH slots, sequentially.

Figure 3:
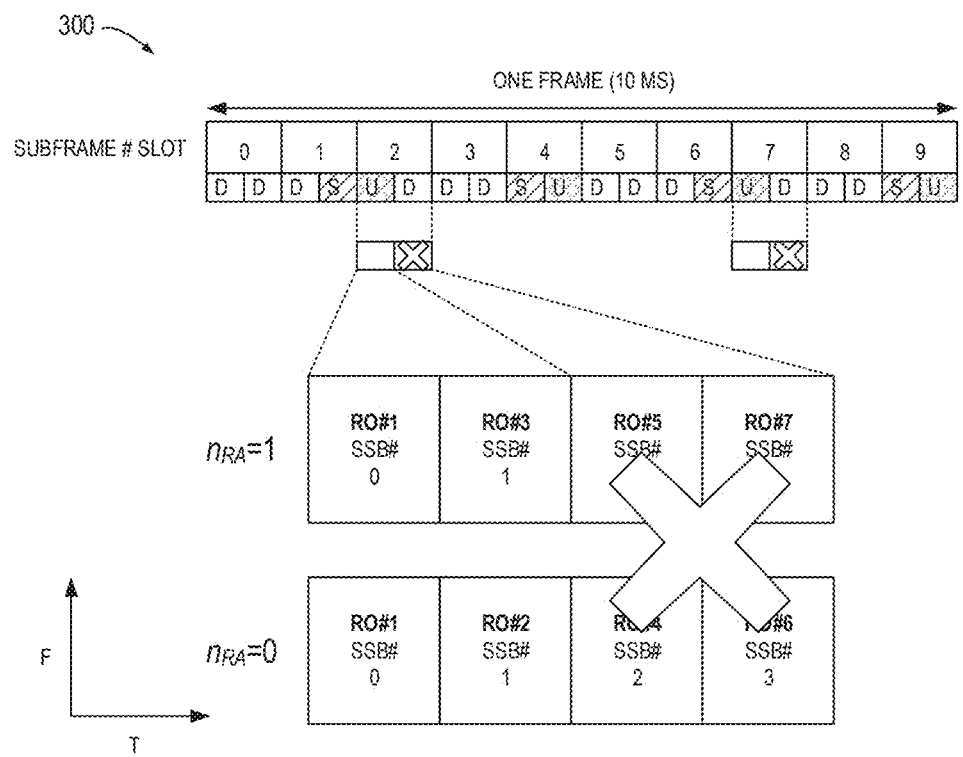
FIG. 3 illustrates an example SSB to RO mapping with UL/DL configuration of DDDSU.

FIG. 3 illustrates an example SSB to RO mapping 300 with UL/DL configuration of DDDSU. In FIG. 3, Msg1-FDM=two, and ssb-perRACH-OccasionAndCB-PreamblesPerSSB is one-half. Based on the configuration, two ROs are multiplexed in the frequency domain (Msg1-FDM=two) and any two ROs multiplexed in the frequency domain are mapped to the same SSB index (based on ssb-perRACH-OccasionAndCB-PreamblesPerSSB=1/2).

In relation to the SSB-to-RO mapping, it defines an association period, starting from frame 0, for mapping SSB indexes to PRACH occasions (i.e., ROs) as the smallest value in the set determined by the PRACH configuration period according to below Table 1 such that all of the SSB indexes are mapped at least once to the PRACH occasions within the association period. The PRACH configuration period referred here is determined at the UE based on the configured PRACH configuration index. In other words, an association period is a period of time wherein all SSB indexes are mapped to at least one RO.

TABLE 1

Mapping between PRACH configuration period and SS/PBCH block to PRACH occasion association period

| PRACH configuration period (msec) | Association period (number of PRACH configuration periods) |
| --- | --- |
| 10 | {1, 2, 4, 8, 16} |
| 20 | {1, 2, 4, 8} |
| 40 | {1, 2, 4} |
| 80 | {1, 2} |
| 160 | {1} |

It also defines an association pattern period as a period of time which includes one or more association periods and is determined so that a pattern between PRACH occasions and SS/PBCH blocks repeats at most every 160 msec.

Figure 4:
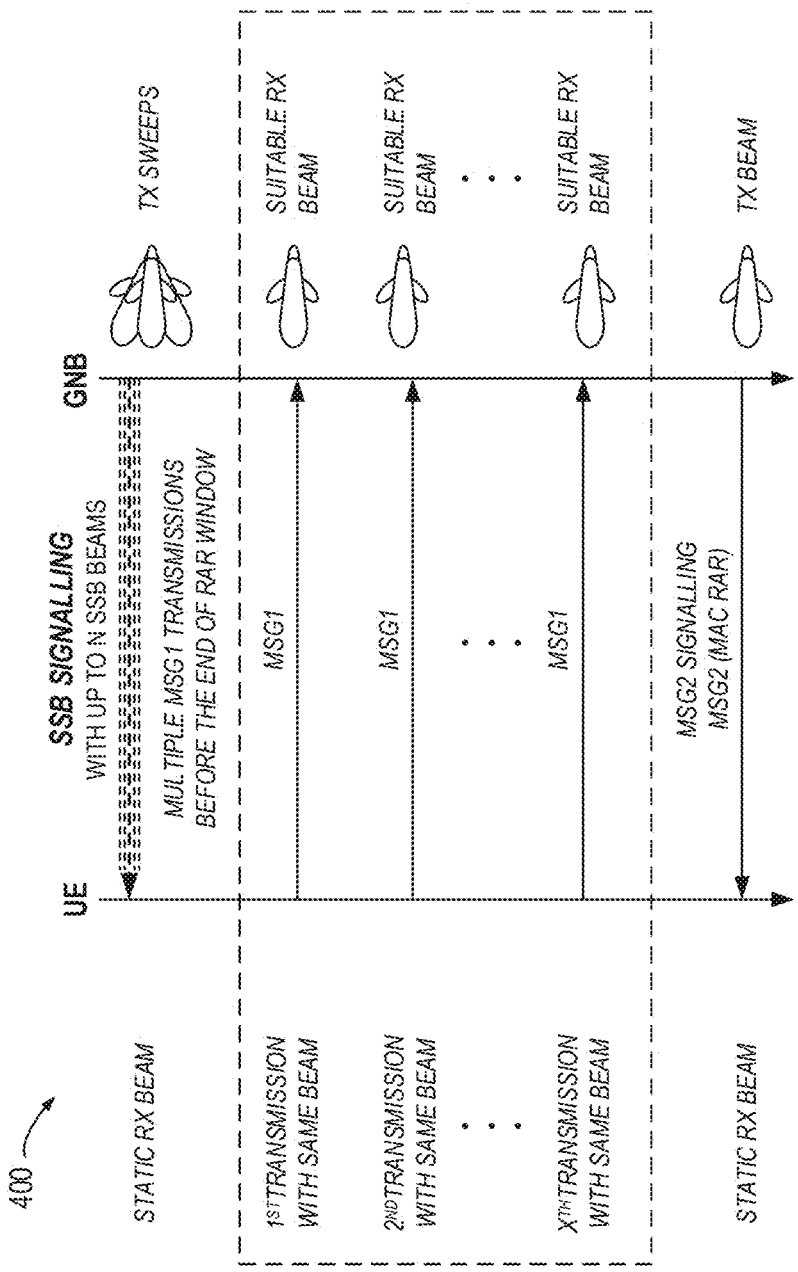
FIG. 4 illustrates a signaling chart of multiple Msg1 transmissions with same Tx beam for each Msg1 transmission.

It allows repetitions of a PRACH (Msg1) transmission. Reference is now made to FIG. 4, which illustrates a signaling chart of multiple Msg1 transmissions with same Tx beam for each Msg1 transmission.

As illustrated in FIG. 4, after identifying a suitable SSB beam (suitable Rx beam from gNB), UE transmits Msg1 multiple times on the RO associated with such beam using the same UE Tx beam configuration for each Msg1.

In operation, multiple RACH occasions are grouped in a set and multiple Msg1s are sent sequentially before the beginning/end of the RAR window. Further, multiple cell-specific repetitions values can be configured at the same time, candidate values are {2,4,8}. In FIG. 4, only one RAR is sent after the last Msg1 is received.

In addition, UE selects whether to use PRACH repetitions and their number, based on cell-specific synchronization signal reference signal received power (SS-RSRP) thresholds. This can be used to reduce the expected number of UEs using this feature, and hence reducing complexity at gNB.

Blind detection complexity at the NW can be controlled by setting a time offset between RO sets, i.e., the density of the sets within a reference time is not fixed, but their position can be.

Figure 5:
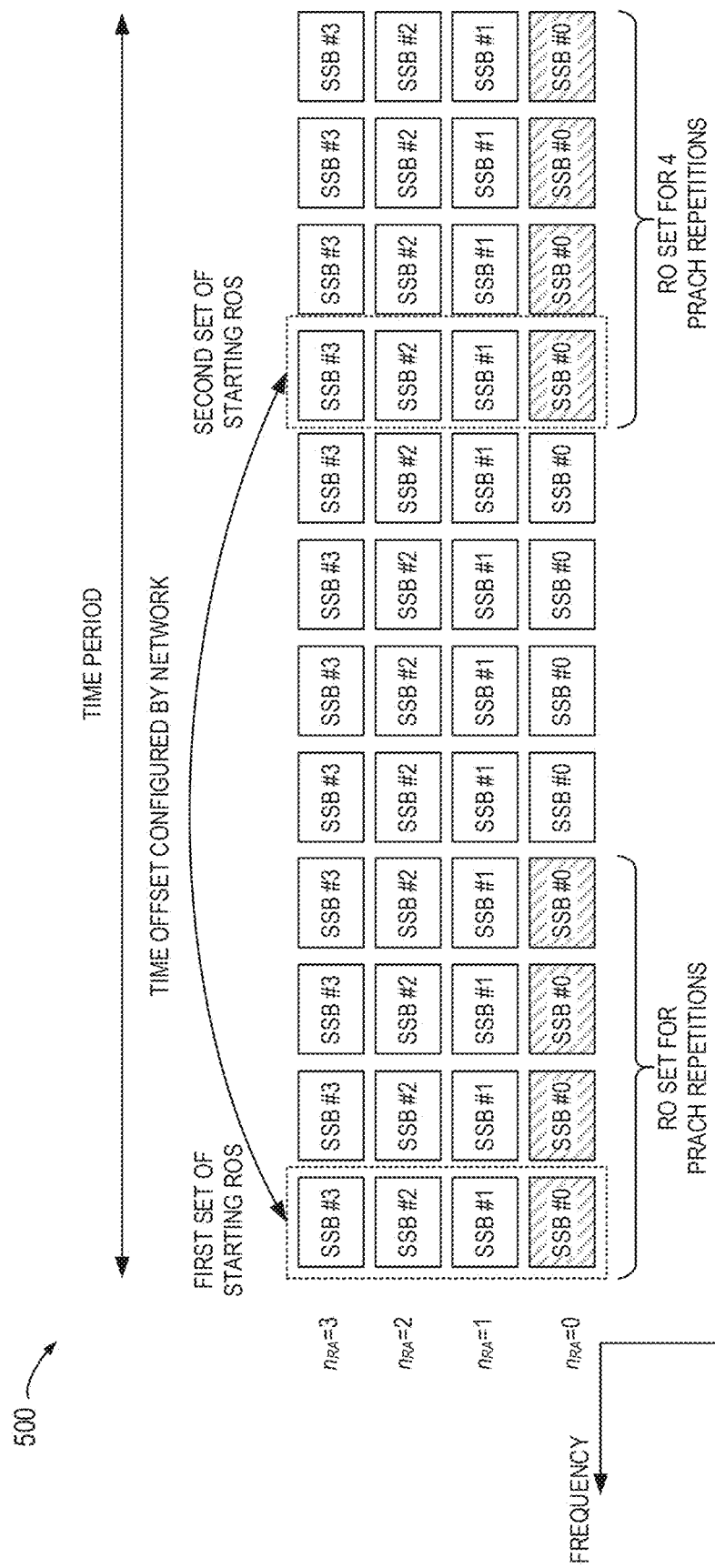
FIG. 5 illustrates an example of RO set determination in a case that time offset is configured and RO set size=4 (4 repetitions)

Reference is now made to FIG. 5, which illustrates an example of RO set determination 500 in a case that the time offset is configured and RO set size=4 (4 repetitions). FIG. 5 provides an example showing 2 RO sets of size 4 ROs in a time period, whereby the starting ROs of the two groups are not separated by 4 valid ROs (which would be the case, if no time offset was configured) but rather by 8 ROs.

In a case that the Msg1/preamble repetitions on SBFD ROs are supported, two components of Msg1/preamble repetitions feature should be redesigned for determining RO sets for SBFD-aware UEs considering the new SBFD ROs, namely, the time period and the starting RO of a RO set.

For the time period, regardless of how the time period is defined for SBFD-aware UEs, gNB should maintain the legacy time period for legacy UEs (UEs that are not aware of SBFD operation), which is determined based on the UL ROs.

Within the legacy time period, SBFD-aware UEs also considers the new SBFD ROs. Therefore, the starting RO of a RO set should be carefully designed taking into account the complexity at the gNB. Indeed, given that the two RO types are used jointly by SBFD-aware UEs to form RO sets, the sets of starting ROs may not be in UL slot, and thus may not be aligned with the legacy (Rel-18) sets of starting ROs. This would impact gNB implementation since the gNB would need to handle different potential starting ROs of different UE types, without any apriori knowledge. In other words, within the (legacy) time period, gNB needs to handle much more candidates of sets of starting ROs for all UEs in network. It's worth noting that, Msg1/preamble repetitions (with the first repetition to be sent on a RO in the set of starting ROs), require more complexity at gNB for exploiting the diversity brought by the repetitions, e.g., for blind detection and/or for buffering the sequence or correlation result of each preamble, etc.

Figure 6:
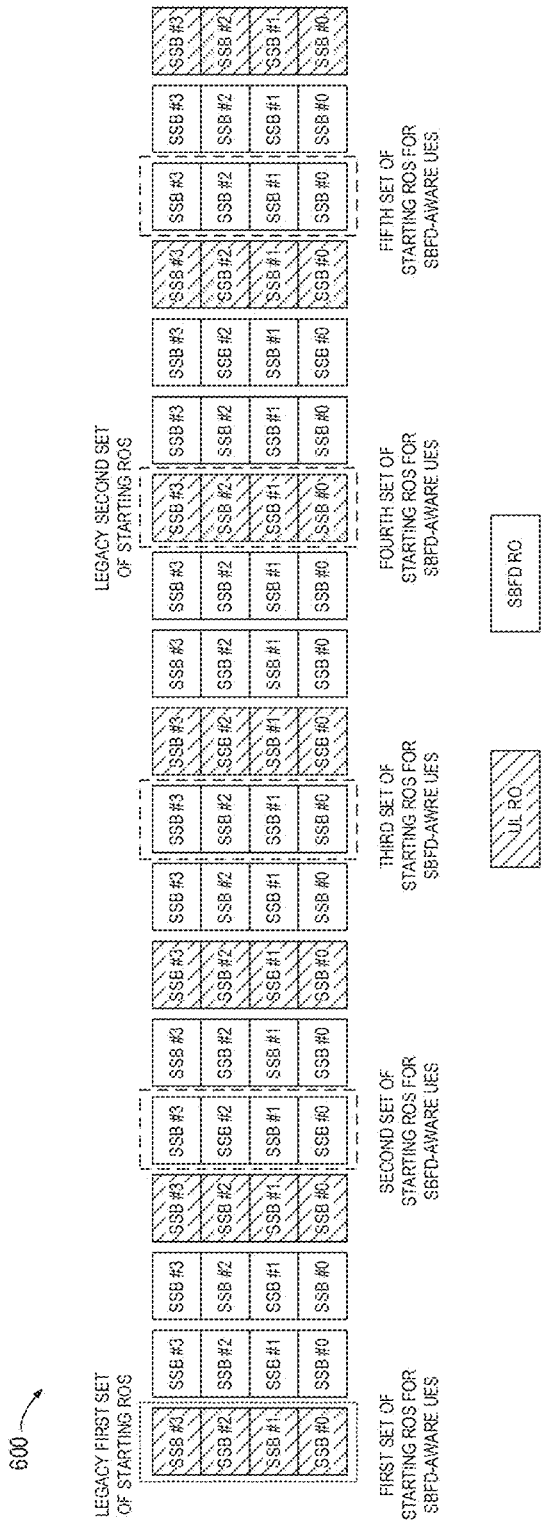
FIG. 6 illustrates an example of the sets of starting ROs for legacy and SBFD-aware UEs, for $$N_{preamble}^{rep} = 4$$

FIG. 6 shows an example of the sets of starting ROs for both legacy and SBFD-aware UEs. This example assumes that the UL RO appears once every three ROs in time for each frequency resource index, the time offset is not configured and the number of Msg1/preamble repetitions is 4. Similarly, FIG. 7 also shows an example of the sets of starting ROs for both legacy and SBFD-aware UEs. This example assumes that the UL RO appears once every three ROs in time for each frequency resource index, the time offset is 8 and the number of Msg1/preamble repetitions is 8. It can be observed from both examples that much more candidates for sets of starting ROs are introduced and need to be handled by gNB when the SBFD ROs are also considered as valid ROs.

In a nutshell, the solution of the present disclosure tries to either minimize the number of additional sets of starting ROs in SBFD symbols for PRACH transmission with preamble repetitions or to split the handling of PRACH transmission with preamble repetitions in UL ROs and SBFD ROs. As a result, the complexity of NW and/or UE is minimized.

Work Principle and Example Signaling for Communication

It should be noted that while the current discussion explicitly targets the unpaired spectrum case, and the present disclosure provides examples which stem from an implicit assumption of TDD, what is discussed herein may apply to both paired and unpaired spectrum, i.e., FDD and TDD. That is, the applicability of the embodiments discussed herein is not limited to a specific duplexing scheme.

Reference is made to FIG. 8, which illustrates a signaling flow 800 of communication in accordance with some embodiments of the present disclosure. For the purposes of discussion, signaling flow 800 will be discussed with reference to FIG. 1A, for example, by using the first apparatus 110 and the second apparatus 120, where the first apparatus 110 may function as a terminal apparatus and the second apparatus 120 may function as a network apparatus.

It is to be understood that the operations at the first apparatus 110 and the second apparatus 120 should be coordinated. In other words, the second apparatus 120 and the first apparatus 110 should have common understanding about configurations, parameters and so on. Such common understanding may be implemented by any suitable interactions between the second apparatus 120 and the first apparatus 110 or both the second apparatus 120 and the first apparatus 110 applying the same rule/policy.

In the following, although some operations are described from a perspective of the first apparatus 110, it is to be understood that the corresponding operations should be performed by the second apparatus 120. Similarly, although some operations are described from a perspective of the second apparatus 120, it is to be understood that the corresponding operations should be performed by the first apparatus 110. Merely for brevity, some of the same or similar contents are omitted here.

In operation, as illustrated in FIG. 8, the second apparatus 120 transmits (810-2) configuration information to the first apparatus 110, and the first apparatus 110 receives (810-2) the configuration information from the second apparatus 120. In some example embodiments, the configuration information may indicate a plurality of PRACH occasions comprising PRACH occasions in uplink resource (referred to as UL RO for brevity sometimes) and PRACH occasions in SBFD resource (referred to as SBD RO for brevity sometimes).

The first apparatus 110 determines (820), based on the configuration information, and for each frequency resource index for frequency multiplexed PRACH occasions, a starting PRACH occasion of a set of PRACH occasions. In particulate, the starting PRACH occasion is determine from the PRACH occasions in uplink resource and the PRACH occasions in SBFD resource.

Then, the first apparatus 110 perform (830-1) the PRACH transmission based at least in part on the starting PRACH occasion of the set to the second apparatus 120, and the second apparatus 120 monitors, based on the configuration information and for each frequency resource index for frequency multiplexed PRACH occasions, the PRACH transmission with preamble repetitions on the set of PRACH occasions accordingly. As a result, the second apparatus 120 receives (830-2) the PRACH transmission based at least in part on the starting PRACH occasion of the set from the first apparatus 110.

In some example embodiments, the PRACH transmission may be performed during a 4-step random access procedure or a 2-step random access procedure.

In some example embodiments, a PRACH occasion in uplink resource may be a PRACH occasion in uplink symbols, and a PRACH occasion in SBFD resource may be a PRACH occasion in SBFD symbols.

In some example embodiments, the first apparatus 110 may receive, from the second apparatus, information about a PRACH occasion mask, wherein the PRACH occasion mask indicating at least one PRACH occasion not allowed to be counted by the first apparatus, and the at least one PRACH occasion comprising at least one of the following: at least one PRACH occasion in uplink resource, or at least one PRACH occasion in SBFD resource. Then the first apparatus 110 may apply the PRACH occasion mask prior to determining the starting PRACH occasion of the set.

Alternatively, in some example embodiments, the first apparatus 110 may receive, from the second apparatus, information about a starting PRACH occasion mask or a bitmap, wherein the starting PRACH occasion mask or the bitmap indicating at least one PRACH occasion not allowed to be validated by the first apparatus 110. Then the first apparatus may determine at least one candidate starting PRACH occasion; and may determine, at least based on the starting PRACH occasion mask or the bitmap, the staring PRACH occasion of the set from the at least one candidate starting PRACH occasion.

Alternatively, in some example embodiments, UE determines the starting ROs of the first set and subsequent sets after applying an RO mask configured by NW, wherein the mask may tell the UE not to count one or more of UL ROs and/or SBFD ROs for the determination.

Alternatively, a starting RO mask or a bitmap is applied by the UE after determining the candidate starting ROs of the first set and subsequent sets, wherein the starting RO mask or the bitmap may tell the UE not to validate one or more of the candidate starting ROs.

Example Embodiments for Aiming at Minimizing the Complexity for NW (Referred to as Embodiments A)

According to some example embodiments of the present disclosure, the number of candidates for the sets of starting ROs may be minimized, such that the complexity for the second apparatus 120 (NW) may be minimized. Such embodiments will be discussed in the following.

In some example embodiments, time period may be independent of the presence of SBFD slots in the frame. Further, only an integer number of RO sets for PRACH transmission with preamble repetitions for SBFD-aware UEs can be determined between the starting ROs of two consecutive sets for non-SBFD-aware UEs.

In some example embodiments, ROs (located in SBFD slots) that are not part of an RO set are not used for preamble repetitions by SBFD-aware UEs. Further, the first valid RO (also referred to as starting RO) of the first set in a time period is the first valid UL RO (instead of "first valid RO, which may be either an UL RO or an SBDF RO").

When performing the PRACH transmission with preamble repetitions, the first apparatus 110 needs to determine a first set of PRACH occasions and at least one subsequent set of PRACH occasions. In some example embodiments, the first PRACH occasion in uplink resource may be determined to be the starting PRACH occasion of the first set.

The starting PRACH occasion of a subsequent set may be determined according to different rules, which will be discussed separately.

Example embodiments where resource offset is configured will be discusses.

In some example embodiments, in a case that the configuration information further indicates a first resource offset indicating the number of consecutive PRACH occasions in uplink resource (such as, Msg1-RepetitionTime OffsetROGroup), the first apparatus 110 may determine a PRACH occasion as the starting PRACH occasion of the subsequent set, where the PRACH occasion is the first PRACH occasion in uplink resource after the first resource offset from a starting PRACH occasion of a previous set.

Accordingly, in some example embodiments, in a case that the configuration information further indicates a first resource offset indicating the number of consecutive PRACH occasions in uplink resource, the second apparatus 120 may monitor the PRACH transmission on the subsequent set, wherein the starting PRACH occasion of the subsequent set is determined to be a PRACH occasion which is the first PRACH occasion in uplink resource after the first resource offset from a starting PRACH occasion of a previous set.

In some example embodiments, in accordance with a determinization that there is at least one PRACH occasion in SBFD resource prior to the first set, the first apparatus 110 may validate the at least one PRACH occasion in SBFD resource for the PRACH transmission.

Accordingly, in some example embodiments, in accordance with a determinization that there is at least one PRACH occasion in SBFD resource prior to the first set, the second apparatus 120 may monitor the at least one PRACH occasion in SBFD resource for the PRACH transmission.

Alternatively, in some example embodiments, in a case that the configuration information further indicates a second resource offset indicating the number of consecutive PRACH occasions in uplink resource and SBFD resource (such as, Msg1-RepetitionTimeOffsetROGroup_SBFD), the first apparatus 110 may determine a PRACH occasion as the starting PRACH occasion of the subsequent set, where the PRACH occasion is the first PRACH occasion in either uplink resource or SBFD resource after the second resource offset from a starting PRACH occasion of a previous set.

Accordingly, in some example embodiments, in a case that the configuration information further indicates a second resource offset indicating the number of consecutive PRACH occasions in uplink resource and SBFD resource (such as, Msg1-RepetitionTimeOffsetROGroup_SBFD), the second apparatus 120 may monitor the PRACH transmission on a subsequent set, wherein a starting PRACH occasion of the subsequent set is determined to be a PRACH occasion which is the first PRACH occasion in either uplink resource or SBFD resource after the second resource offset from a starting PRACH occasion of a previous set.

Alternatively, in some example embodiments, in a case that the configuration information further indicates a third resource offset indicating the number of consecutive PRACH occasions in SBFD resource (such as, Msg1-RepetitionTimeOffsetROGroup_SBFD), the first apparatus 110 may determine a PRACH occasion as the starting PRACH occasion of the subsequent set, where the PRACH occasion is the first PRACH occasion in SBFD resource after the third resource offset from a starting PRACH occasion of a previous set.

Accordingly, in some example embodiments, in a case that the configuration information further indicates a third resource offset indicating the number of consecutive PRACH occasions in SBFD resource, the second apparatus 120 may monitor the PRACH transmission on the subsequent set, wherein the starting PRACH occasion of the subsequent set is determined to be a PRACH occasion which is the first PRACH occasion in SBFD resource after the third resource offset from a starting PRACH occasion of a previous set.

In order to better understand the above procedure, some further example embodiments will be further discussed as below with reference to FIG. 9, which illustrates a signaling chart 900 of communication according to some example embodiments of the present disclosure.

In FIG. 9, at Step 1: NW configures, and UE determines ROs in UL slots (i.e., UL ROs) and ROs in SBFD slots (i.e., SBFD ROs).

At, Step 2, in some example embodiments, the NW configures a legacy time offset (referred to as Alternative 1A) or a dedicated time offset (e.g., Msg1-RepetitionTime OffsetROGroup_SBFD) for SBFD-aware UE (referred to as Alternative 1B).

At Step 3, UE determines starting RO for Msg1/preamble repetition. UE determines that the first valid RO (also referred to as a starting RO) of the first set in a time period is the first valid UL RO (instead of "first valid RO"). UE determines the starting RO of subsequent sets, if any, using at least one of the following alternatives:

In a case of Alternative 1A, parameter Msg1-RepetitionTime OffsetROGroup is reused. The starting RO of subsequent sets, if any, is after Msg1-RepetitionTimeOffsetROGroup consecutive valid ROs located in UL slots, a.k.a. UL ROs (instead of "consecutive valid ROs", which includes also SBFD ROs) from the starting RO of the previous set. In other words, this alternative proposes SBFD-aware UEs to skip SBFD ROs when counting the time offset and implies that a starting ROs of a set for Msg1/preamble repetitions for SBFD-aware UEs is always also a starting RO of a set for Msg1/preamble repetitions for non-SBFD-aware UEs.

Additionally, in some example embodiments, in a case some SBFD ROs are available before the first legacy set of ROs (UL ROs). The SBFD-aware UE will consider the first SBFD ROs set as valid with a dedicated number of PRACH repetitions. In this case, an exemption SBFD set of ROs will be validated before the first legacy set of ROs. From the first legacy set, Alt.1A is applied.

In a case of Alternative 1B, NW configures a dedicated time offset for SBFD-aware UEs, e.g., Msg1-RepetitionTimeOffsetROGroup_SBFD. The starting RO of subsequent sets, if any, is after Msg1-RepetitionTimeOffsetRO-Group_SBFD from the starting RO of the previous set, where Msg1-RepetitionTimeOffsetROGroup_SBFD is expressed in consecutive valid ROs. In other words, according to this alternative, a starting ROs of a set for Msg1/preamble repetitions for SBFD-aware UEs may or may not coincide with a starting RO of a set for Msg1/preamble repetitions for non-SBFD-aware UEs.

Alternatively, in some example embodiments, parameter Msg1-RepetitionTime OffsetROGroup_SBFD may be expressed in consecutive valid SBFD ROs.

At, Step 4, UE transmits PRACH with repetitions starting from the determined starting RO.

Example embodiments where the time offset is not configured are discussed in the following.

In some example embodiments, in a case that a resource offset for the PRACH transmission with preamble repetitions is not configured, the first apparatus 110 may determine a PRACH occasion as the starting PRACH occasion of the subsequent set, wherein the PRACH occasion is the first PRACH occasion in uplink resource after PRACH occasions of a previous set.

Accordingly, in some example embodiments, in a case that a resource offset for the PRACH transmission with preamble repetitions is not configured, the second apparatus 120 may monitor the PRACH transmission on the subsequent set, wherein the starting PRACH occasion of the subsequent set is determined to be a PRACH occasion which is the first PRACH occasion in uplink resource after PRACH occasions of a previous set.

In some example embodiments, in accordance with a determinization that there is at least one PRACH occasion in SBFD resource prior to the first set, the first apparatus 110 may validate the PRACH transmission on the at least one PRACH occasion in SBFD resource.

Accordingly, in some example embodiments, in accordance with a determinization that there is at least one PRACH occasion in SBFD resource prior to the first set, the second apparatus 120 may monitor the PRACH transmission on the at least one PRACH occasion in SBFD resource.

In some example embodiments, in a case that a resource offset for the PRACH transmission with preamble repetitions is not configured, in accordance with a determinization that the number of valid PRACH occasions in SBFD resource after PRACH occasions of a previous set and before PRACH occasions of a next set is sufficient to form a set of PRACH occasions for a PRACH transmission with preamble repetitions (where the starting PRACH occasion of the previous set and the starting PRACh occasion of the next set are in uplink resource), the first apparatus 110 may determine a PRACH occasion as the starting PRACH occasion of the subsequent set, where the PRACH occasion is the first PRACH occasion in either uplink resource or SBFD resource after PRACH occasions of the previous set.

Accordingly, in some example embodiments, in a case that a resource offset for the PRACH transmission with preamble repetitions is not configured, in accordance with a determinization that the number of valid PRACH occasions in SBFD resource after PRACH occasions of a previous set and before PRACH occasions of a next set is sufficient to form a set of PRACH occasions for a PRACH transmission with preamble repetitions (where the starting PRACH occasion of the previous set and the starting PRACh occasion of the next set are in uplink resource), the second apparatus 120 may monitor the PRACH transmission on the subsequent set, wherein the starting PRACH occasion of the subsequent set is determined to be a PRACH occasion which is the first PRACH occasion in either uplink resource or SBFD resource after PRACH occasions of a previous set.

In some example embodiments, in a case that a resource offset for the PRACH transmission with preamble repetitions is not configured, the first apparatus 110 may determine a PRACH occasion as the starting PRACH occasion of the subsequent set, wherein the PRACH occasion is the first PRACH occasion in SBFD resource after PRACH occasions of a previous set.

Accordingly, in some example embodiments, in a case that a resource offset for the PRACH transmission with preamble repetitions is not configured, the second apparatus 120 may monitor the PRACH transmission on the subsequent set, wherein the starting PRACH occasion of the subsequent set is determined to be a PRACH occasion which is the first PRACH occasion in SBFD resource after PRACH occasions of a previous set.

In order to better understand the above procedure, some further example embodiments will be further discussed as below with reference to FIG. 10, which illustrates a signaling chart 1000 of communication according to some example embodiments of the present disclosure.

At Step 1, NW configures, and UE determines ROs in UL slots (i.e., UL ROs) and ROs in SBFD slots (i.e., SBFD ROs).

At Step 2, UE determines starting RO for Msg1/preamble repetition. UE determines that the first valid RO (also referred to as starting RO) of the first set in a time period is the first valid UL RO (instead of "first valid RO"). UE determines the starting RO of subsequent sets, if any, using at least one of the following alternatives:

In some example embodiments, the starting RO of subsequent sets, if any, is the first valid UL RO after the ROs of the previous set (referred to as alternative 2A). This implies some valid SBFD ROs may be skipped during RO set determination, and that at most one set for Msg1/preamble repetitions for SBFD-aware UEs is determined in between two consecutive starting ROs of sets for Msg1/preamble repetitions for non-SBFD-aware UEs. This implies that a starting ROs of a set for Msg1/preamble repetitions for SBFD-aware UEs is always also a starting RO of a set for Msg1/preamble repetitions for non-SBFD-aware UEs.

Additionally, in some example embodiments. in a case some SBFD ROs are available before the first legacy set of ROs (UL ROs). The SBFD-aware UE will consider the first SBFD ROs set as valid with a dedicated number of PRACH repetitions. In this case, an exemption SBFD set of ROs will be validated before the first legacy set of ROs.

In some example embodiments, if at least $$N^{rep}_{preamble}$$

valid ROs exist after the ROs of the previous set for Msg1/preamble repetitions for non-SBFD-aware UEs, and before the starting RO of the subsequent set for Msg1/preamble repetitions for non-SBFD-aware UEs, the starting RO of the subsequent set for Msg1/preamble repetitions, for SBFD-aware UEs, is the first valid RO after the ROs of the previous set (referred to as alternative 2B). This implies that a starting ROs of a set for Msg1/preamble repetitions for SBFD-aware UEs may or may not coincide with a starting RO of a set for Msg1/preamble repetitions for non-SBFD-aware UEs.

At Step 3, UE transmits PRACH with repetitions starting from the determined starting RO.

In some example embodiments, regardless of whether the resource offset is configured or not, in accordance with a determinization that there is at least one candidate starting PRACH occasion in SBFD resource between two consecutive staring PRACH occasions in uplink resource, the first apparatus 110 may validate at least part of the at least one candidate starting PRACH occasion in SBFD resource for the PRACH transmission with preamble repetitions.

Accordingly, in some example embodiments, in accordance with a determinization that there is at least one candidate starting PRACH occasion in SBFD resource between two consecutive staring PRACH occasions in uplink resource, the second apparatus 120 may monitor at least part of the at least one candidate starting PRACH occasion in SBFD resource for the PRACH transmission with preamble repetitions.

In some example embodiments, the number of candidate starting PRACH occasions to be validated is configured by the second apparatus 120 or pre-defined as a default value.

In order to better understand the above procedure, some further example embodiments will be further discussed as below with reference to FIG. 11, which illustrates a signaling chart of communication 1100 according to some example embodiments of the present disclosure.

At Step 1, NW configures, and UE determines ROs in UL slots (i.e., UL ROs) and ROs in SBFD slots (i.e., SBFD ROs). At Step 2: NW optionally configures a value N.

At Step 3: UE determines starting RO for Msg1/preamble repetition. UE determines that the first valid RO (also referred to as starting RO) of the first set in a time period is the first valid UL RO (instead of "first valid RO"). UE determines the starting RO of subsequent sets, if any, as follows: regardless of whether the time offset is configured or not, only the first N sets of starting ROs for SBFD aware UEs in between two consecutive legacy sets of starting ROs (in UL symbols) are valid, where N is configured by NW in step 2 (or hardcoded in specification, i.e., pre-defined). Alternatively, UE determines the starting ROs of the first set and subsequent sets after applying an RO mask configured by NW, wherein the mask may tell the UE not to count one or more of UL ROs and/or SBFD ROs for the determination. Alternatively, a starting RO mask or a bitmap is applied by the UE after determining the candidate starting ROs of the first set and subsequent sets, wherein the starting RO mask or the bitmap may tell the UE not to validate one or more of the candidate starting ROs. At Step 4: UE transmits PRACH with repetitions starting from the determined starting RO.

Example Embodiments about Distinguishing SBFD-Aware UEs from Non-SBFD-Aware UEs (Referred to as Embodiments B)

Instead of trying to minimize the number of candidates for the sets of starting ROs, according to some example embodiments of the present disclosure, SBFD-aware UEs with Msg1/preamble repetitions and legacy UEs with Msg1/preamble repetitions may be distinguished, which also facilitates NW implementation in the sense that NW doesn't expect to receive/monitor a PRACH transmission with preamble repetitions in the next SBFD RO if the starting RO is an UL RO. Such embodiment will be discussed in the following.

In some example embodiments, the first PRACH occasion in SBFD resource may be determined to be the starting PRACH occasion of the first set.

In some example embodiments, the first apparatus 110 may determine a starting PRACH occasion of the subsequent set from PRACH occasions in SBFD resource or by skipping the PRACH occasions in uplink resource. Then the PRACH transmission with preamble repetitions may be performed on the subsequent set.

Accordingly, in some example embodiments, the second apparatus 120 may monitor the PRACH transmission on the subsequent set, wherein the starting PRACH occasion of the subsequent set is determined from PRACH occasions in SBFD resource or by skipping the PRACH occasions in uplink resource.

In order to better understand the above procedure, some further example embodiments will be further discussed as below, where the UE is uses as an example of the first apparatus and the NW is used as an example of the second apparatus.

In operation, for transmitting Msg1 with repetitions, SBFD-aware UEs only use the sets of starting ROs in SBFD symbols (or, in other words, sets of starting ROs consisting only SBFD ROs). Note that this doesn't prevent SBFD-aware UEs to use UL ROs (or SBFD ROs) for transmitting Msg1 without repetitions.

It should be noted that Embodiments B may be applied alternatively (independently from) or additionally (together with) to the Embodiments A.

Example Embodiments about Separating SBFD ROs and the UL ROs (Referred to as Embodiments C)

According to some example embodiments of the present disclosure, the complexity for NW may be minimized by letting NW handles separately the repetitions in SBFD ROs whose RO sets do not count UL ROs as valid (while it can handle the UL ROs as per legacy). In addition, compared to no handling, the skipping of UL ROs would end up that the number of sets of starting ROs in SBFD symbols will be reduced within a certain duration. Such embodiment will be discussed in the following.

In some example embodiments, the set may be: a set of first PRACH occasions determined by skipping the PRACH occasions in SBFD resource or only counting PRACH occasions in uplink resource; or a set of second PRACH occasions determined by skipping the PRACH occasions in uplink resource or only counting PRACH occasions in SBFD resource.

In some example embodiments, it is proposed that for transmitting PRACH transmission with preamble repetitions, SBFD-aware UEs determine starting ROs in both UL and SBFD symbols, but the UL starting ROs are used only for creating RO sets of UL ROs (ROs in UL symbols) and the SBFD starting ROs are used only for creating RO set of SBFD ROs (ROs in SBFD symbols). This embodiment suggests separating SBFD ROs and UL ROs and then determine starting ROs for each of the RO type. For determining SBFD RO sets, UL ROs are not counted as valid ROs.

Example Methods

FIG. 12 shows a flowchart of an example method 1200 implemented at a first apparatus in accordance with some example embodiments of the present disclosure. For the purpose of discussion, the method 1200 will be described from the perspective of the first apparatus 110 in FIG. 1.

At block 1210, the first apparatus receives, from a second apparatus, configuration information indicating a plurality of physical random access channel (PRACH) occasions comprising PRACH occasions in uplink resource and PRACH occasions in sub-band non-overlapping full-duplex (SBFD) resource.

At block 1220, the first apparatus determines, based on the configuration information, and for each frequency resource index for frequency multiplexed PRACH occasions, a starting PRACH occasion of a set of PRACH occasions for a PRACH transmission with preamble repetitions from the PRACH occasions in uplink resource and the PRACH occasions in SBFD resource.

At block 1230, the first apparatus performs, to the second apparatus, the PRACH transmission based at least in part on the starting PRACH occasion of the set.

In some example embodiments, the set is the first set and the first PRACH occasion in uplink resource is determined to be the starting PRACH occasion of the first set.

In some example embodiments, the set is a subsequent set, and the configuration information further indicates a first resource offset indicating the number of consecutive PRACH occasions in uplink resource, the first apparatus may determine a PRACH occasion as the starting PRACH occasion of the subsequent set, wherein the PRACH occasion is the first PRACH occasion in uplink resource after the first resource offset from a starting PRACH occasion of a previous set.

In some example embodiments, the set is a subsequent set, and the configuration information further indicates a second resource offset indicating the number of consecutive PRACH occasions in uplink resource, the first apparatus may determine a PRACH occasion as the starting PRACH occasion of the subsequent set, wherein the PRACH occasion is the first PRACH occasion in either uplink resource or SBFD resource after the second resource offset from a starting PRACH occasion of a previous set.

In some example embodiments, the set is a subsequent set, and the configuration information further indicates a third resource offset indicating the number of consecutive PRACH occasions in uplink resource, the first apparatus may determine a PRACH occasion as the starting PRACH occasion of the subsequent set, wherein the PRACH occasion is the first PRACH occasion in SBFD resource after the third resource offset from a starting PRACH occasion of a previous set.

In some example embodiments, the set is a subsequent set, and a resource offset for the PRACH transmission with preamble repetitions is not configured, the first apparatus may determine a PRACH occasion as the starting PRACH occasion of the subsequent set, wherein the PRACH occasion is the first PRACH occasion in uplink resource after PRACH occasions of a previous set.

In some example embodiments, the set is a subsequent set, and a resource offset for the PRACH transmission with preamble repetitions is not configured, in accordance with a determinization that the number of valid PRACH occasions in SBFD resource after PRACH occasions of a previous set and before PRACH occasions of a next set is sufficient to form a set of PRACH occasions for a PRACH transmission with preamble repetitions, wherein the starting PRACH occasion of the previous set and the starting PRACh occasion of the next set are in uplink resource, the first apparatus may determine a PRACH occasion as the starting PRACH occasion of the subsequent set, wherein the PRACH occasion is the first PRACH occasion in either uplink resource or SBFD resource after PRACH occasions of the previous set.

In some example embodiments, the set is a subsequent set, and a resource offset for the PRACH transmission with preamble repetitions is not configured, the first apparatus may determine a PRACH occasion as the starting PRACH occasion of the subsequent set, wherein the PRACH occasion is the first PRACH occasion in SBFD resource after PRACH occasions of a previous set.

In some example embodiments, in accordance with a determinization that there is at least one PRACH occasion in SBFD resource prior to the first set, the first apparatus may validate the at least one PRACH occasion in SBFD resource for the PRACH transmission.

In some example embodiments, in accordance with a determinization that there is at least one candidate starting PRACH occasion in SBFD resource between two consecutive staring PRACH occasions in uplink resource, validate at least part of the at least one candidate starting PRACH occasion in SBFD resource for the PRACH transmission with preamble repetitions.

In some example embodiments, the number of candidate starting PRACH occasions to be validated is configured by the second apparatus or pre-defined as a default value.

In some example embodiments, the set is the first set and the first PRACH occasion in SBFD resource is determined to be the starting PRACH occasion of the first set.

In some example embodiments, the first apparatus may determine a starting PRACH occasion of the subsequent set from PRACH occasions in SBFD resource or by skipping the PRACH occasions in uplink resource.

In some example embodiments, the set is: a set of first PRACH occasions determined by skipping the PRACH occasions in SBFD resource or only counting PRACH occasions in uplink resource; or a set of second PRACH occasions determined by skipping the PRACH occasions in uplink resource or only counting PRACH occasions in SBFD resource.

In some example embodiments, the first apparatus may receive, from the second apparatus, information about a PRACH occasion mask, wherein the PRACH occasion mask indicating at least one PRACH occasion not allowed to be counted by the first apparatus, and the at least one PRACH occasion comprising at least one of the following: at least one PRACH occasion in uplink resource, or at least one PRACH occasion in SBFD resource; and apply the PRACH occasion mask prior to determining the starting PRACH occasion of the set.

In some example embodiments, the first apparatus may receive, from the second apparatus, information about a starting PRACH occasion mask or a bitmap, wherein the starting PRACH occasion mask or the bitmap indicating at least one PRACH occasion not allowed to be validated by the first apparatus. Then the first apparatus may determine at least one candidate starting PRACH occasion; and may determine, at least based on the starting PRACH occasion mask or the bitmap, the staring PRACH occasion of the set from the at least one candidate starting PRACH occasion.

In some example embodiments, the PRACH transmission is performed during a 4-step random access procedure or a 2-step random access procedure.

In some example embodiments, a PRACH occasion in uplink resource is a PRACH occasion in uplink symbols, and a PRACH occasion in SBFD resource is a PRACH occasion in SBFD symbols.

In some example embodiments, the first apparatus is or is comprised in terminal device, and the second apparatus is or is comprised in a network device.

FIG. 13 shows a flowchart of an example method 1300 implemented at a second apparatus in accordance with some example embodiments of the present disclosure. For the purpose of discussion, the method 1300 will be described from the perspective of the second apparatus 120 in FIG. 1.

At block 1310, the second apparatus transmits, to a first apparatus, configuration information indicating a plurality of physical random access channel (PRACH) occasions comprising PRACH occasions in uplink resource and PRACH occasions in sub-band non-overlapping full-duplex (SBFD) resource.

At block 1320, the second apparatus monitors, based on the configuration information and for each frequency resource index for frequency multiplexed PRACH occasions, a PRACH transmission with preamble repetitions on a set of PRACH occasions for the PRACH transmission, wherein a starting PRACH occasion of the set is determined from the PRACH occasions in uplink resource, and the PRACH occasions in SBFD resource.

At block 1330, the second apparatus 120 receives, from the first apparatus, the PRACH transmission based at least in part on the starting PRACH occasion of the set.

In some example embodiments, the set is the first set and the first PRACH occasion in uplink resource is determined to be the starting PRACH occasion of the first set.

In some example embodiments, the set is a subsequent set and the configuration information further indicates a first resource offset indicating the number of consecutive PRACH occasions in uplink resource, the second apparatus may monitor the PRACH transmission on the subsequent set, wherein the starting PRACH occasion of the subsequent set is determined to be a PRACH occasion which is the first PRACH occasion in uplink resource after the first resource offset from a starting PRACH occasion of a previous set.

In some example embodiments, the set is a subsequent set and the configuration information further indicates a second resource offset indicating the number of consecutive PRACH occasions in uplink resource, the second apparatus may monitor the PRACH transmission on a subsequent set, wherein a starting PRACH occasion of the subsequent set is determined to be a PRACH occasion which is the first PRACH occasion in either uplink resource or SBFD resource after the second resource offset from a starting PRACH occasion of a previous set.

In some example embodiments, the set is a subsequent set and the configuration information further indicates a third resource offset indicating the number of consecutive PRACH occasions in uplink resource, the second apparatus may monitor the PRACH transmission on the subsequent set, wherein the starting PRACH occasion of the subsequent set is determined to be a PRACH occasion which is the first PRACH occasion in SBFD resource after the third resource offset from a starting PRACH occasion of a previous set.

In some example embodiments, the set is a subsequent set, and a resource offset for the PRACH transmission with preamble repetitions is not configured, the second apparatus may monitor the PRACH transmission on the subsequent set, wherein the starting PRACH occasion of the subsequent set is determined to be a PRACH occasion which is the first PRACH occasion in uplink resource after PRACH occasions of a previous set.

In some example embodiments, the set is a subsequent set, and a resource offset for the PRACH transmission with preamble repetitions is not configured, in accordance with a determinization that the number of valid PRACH occasions in SBFD resource after PRACH occasions of a previous set and before PRACH occasions of a next set is sufficient to form a set of PRACH occasions for a PRACH transmission with preamble repetitions, wherein the starting PRACH occasion of the previous set and the starting PRACh occasion of the next set are in uplink resource, the second apparatus may monitor the PRACH transmission on the subsequent set, wherein the starting PRACH occasion of the subsequent set is determined to be a PRACH occasion which is the first PRACH occasion in either uplink resource or SBFD resource after PRACH occasions of a previous set.

In some example embodiments, the set is a subsequent set, and a resource offset for the PRACH transmission with preamble repetitions is not configured, the second apparatus may monitor the PRACH transmission on the subsequent set, wherein the starting PRACH occasion of the subsequent set is determined to be a PRACH occasion which is the first PRACH occasion in SBFD resource after PRACH occasions of a previous set.

In some example embodiments, in accordance with a determinization that there is at least one PRACH occasion in SBFD resource prior to the first set, the second apparatus may monitor the PRACH transmission on the at least one PRACH occasion in SBFD resource.

In some example embodiments, in accordance with a determinization that there is at least one candidate starting PRACH occasion in SBFD resource between two consecutive staring PRACH occasions in uplink resource, the second apparatus may monitor at least part of the at least one candidate starting PRACH occasion in SBFD resource for the PRACH transmission with preamble repetitions.

In some example embodiments, the number of candidate starting PRACH occasions to be validated is configured by the second apparatus or pre-defined as a default value.

In some example embodiments, the set is the first set and the first PRACH occasion in SBFD resource is determined to be the starting PRACH occasion of the first set.

In some example embodiments, the second apparatus may monitor the PRACH transmission on the subsequent set, wherein the starting PRACH occasion of the subsequent set is determined from PRACH occasions in SBFD resource or by skipping the PRACH occasions in uplink resource.

In some example embodiments, the set is: a set of first PRACH occasions determined by skipping the PRACH occasions in SBFD resource or only counting PRACH occasions in uplink resource; or a set of second PRACH occasions determined by skipping the PRACH occasions in uplink resource or only counting PRACH occasions in SBFD resource.

In some example embodiments, the second apparatus may transmit, to the first apparatus, information about a PRACH occasion mask, wherein the PRACH occasion mask indicating at least one PRACH occasion not allowed to be counted by the first apparatus, and the at least one PRACH occasion comprising at least one of the following: at least one PRACH occasion in uplink resource, or at least one PRACH occasion in SBFD resource.

In some example embodiments, the second apparatus may transmit, to the first apparatus, information about a starting PRACH occasion mask or a bitmap, wherein the starting PRACH occasion mask or the bitmap indicating at least one PRACH occasion not allowed to be validated by the first apparatus.

In some example embodiments, the PRACH transmission is performed during a 4-step random access procedure or a 2-step random access procedure.

In some example embodiments, a PRACH occasion in uplink resource is a PRACH occasion in uplink symbols, and a PRACH occasion in SBFD resource is a PRACH occasion in SBFD symbols.

In some example embodiments, the first apparatus is or is comprised in terminal device, and the second apparatus is or is comprised in a network device.

Example Apparatus, Device and Medium

In some example embodiments, a first apparatus capable of performing any of the method 1200 (for example, the first apparatus 110 in FIG. 1A) may comprise means for performing the respective operations of the method 1200. The means may be implemented in any suitable form. For example, the means may be implemented in a circuitry or software module. The first apparatus may be implemented as or included in the first apparatus 110 in FIG. 1A.

In some example embodiments, the first apparatus comprises means for receiving, from a second apparatus, configuration information indicating a plurality of physical random access channel (PRACH) occasions comprising PRACH occasions in uplink resource and PRACH occasions in sub-band non-overlapping full-duplex (SBFD) resource; means for determining, based on the configuration information, and for each frequency resource index for frequency multiplexed PRACH occasions, a starting PRACH occasion of a set of PRACH occasions for a PRACH transmission with preamble repetitions from the PRACH occasions in uplink resource and the PRACH occasions in SBFD resource, and means for performing, to the second apparatus, the PRACH transmission based at least in part on the starting PRACH occasion of the set.

In some example embodiments, the set is the first set and the first PRACH occasion in uplink resource is determined to be the starting PRACH occasion of the first set.

In some example embodiments, the set is a subsequent set, and the configuration information further indicates a first resource offset indicating the number of consecutive PRACH occasions in uplink resource and SBFD resource, the first apparatus further comprises: means for determining a PRACH occasion as the starting PRACH occasion of the subsequent set, wherein the PRACH occasion is the first PRACH occasion in uplink resource after the first resource offset from a starting PRACH occasion of a previous set.

In some example embodiments, the set is a subsequent set, and the configuration information further indicates a second resource offset indicating the number of consecutive PRACH occasions in uplink resource and SBFD resource, the first apparatus further comprises: means for determining a PRACH occasion as the starting PRACH occasion of the subsequent set, wherein the PRACH occasion is the first PRACH occasion in either uplink resource or SBFD resource after the second resource offset from a starting PRACH occasion of a previous set.

In some example embodiments, the set is a subsequent set, and the configuration information further indicates a third resource offset indicating the number of consecutive PRACH occasions in uplink resource and SBFD resource the first apparatus further comprises: means for determining a PRACH occasion as the starting PRACH occasion of the subsequent set, wherein the PRACH occasion is the first PRACH occasion in SBFD resource after the third resource offset from a starting PRACH occasion of a previous set.

In some example embodiments, the set is a subsequent set, and a resource offset for the PRACH transmission with preamble repetitions is not configured the first apparatus further comprises: means for determining a PRACH occasion as the starting PRACH occasion of the subsequent set, wherein the PRACH occasion is the first PRACH occasion in uplink resource after PRACH occasions of a previous set.

In some example embodiments, the set is a subsequent set, and a resource offset for the PRACH transmission with preamble repetitions is not configured, the first apparatus further comprises: means for in accordance with a determinization that the number of valid PRACH occasions in SBFD resource after PRACH occasions of a previous set and before PRACH occasions of a next set is sufficient to form a set of PRACH occasions for a PRACH transmission with preamble repetitions, wherein the starting PRACH occasion of the previous set and the starting PRACh occasion of the next set are in uplink resource, determining a PRACH occasion as the starting PRACH occasion of the subsequent set, wherein the PRACH occasion is the first PRACH occasion in either uplink resource or SBFD resource after PRACH occasions of the previous set.

In some example embodiments, the set is a subsequent set, and a resource offset for the PRACH transmission with preamble repetitions is not configured, the first apparatus further comprises: means for determining a PRACH occasion as the starting PRACH occasion of the subsequent set, wherein the PRACH occasion is the first PRACH occasion in SBFD resource after PRACH occasions of a previous set.

In some example embodiments, the first apparatus further comprises: means for in accordance with a determinization that there is at least one PRACH occasion in SBFD resource prior to the first set, validating the at least one PRACH occasion in SBFD resource for the PRACH transmission.

In some example embodiments, the first apparatus further comprises: means for in accordance with a determinization that there is at least one candidate starting PRACH occasion in SBFD resource between two consecutive staring PRACH occasions in uplink resource, validating at least part of the at least one candidate starting PRACH occasion in SBFD resource for the PRACH transmission with preamble repetitions.

In some example embodiments, the number of candidate starting PRACH occasions to be validated is configured by the second apparatus or pre-defined as a default value.

In some example embodiments, the set is the first set and the first PRACH occasion in SBFD resource is determined to be the starting PRACH occasion of the first set.

In some example embodiments, the first apparatus further comprises: means for determining a starting PRACH occasion of the subsequent set from PRACH occasions in SBFD resource or by skipping the PRACH occasions in uplink resource.

In some example embodiments, the set is: a set of first PRACH occasions determined by skipping the PRACH occasions in SBFD resource or only counting PRACH occasions in uplink resource; or a set of second PRACH occasions determined by skipping the PRACH occasions in uplink resource or only counting PRACH occasions in SBFD resource.

In some example embodiments, the first apparatus further comprises: means for receiving, from the second apparatus, information about a PRACH occasion mask, wherein the PRACH occasion mask indicating at least one PRACH occasion not allowed to be counted by the first apparatus, and the at least one PRACH occasion comprising at least one of the following: at least one PRACH occasion in uplink resource, or at least one PRACH occasion in SBFD resource; and means for applying the PRACH occasion mask prior to determining the starting PRACH occasion of the set.

In some example embodiments, the first apparatus further comprises: means for receiving from the second apparatus, information about a starting PRACH occasion mask or a bitmap, wherein the starting PRACH occasion mask or the bitmap indicating at least one PRACH occasion not allowed to be validated by the first apparatus; determining at least one candidate starting PRACH occasion; and may determining, at least based on the starting PRACH occasion mask or the bitmap, the staring PRACH occasion of the set from the at least one candidate starting PRACH occasion.

In some example embodiments, the PRACH transmission is performed during a 4-step random access procedure or a 2-step random access procedure.

In some example embodiments, a PRACH occasion in uplink resource is a PRACH occasion in uplink symbols, and a PRACH occasion in SBFD resource is a PRACH occasion in SBFD symbols.

In some example embodiments, the first apparatus is or is comprised in terminal device, and the second apparatus is or is comprised in a network device.

In some example embodiments, a second apparatus capable of performing any of the method 1300 (for example, the second apparatus 120 in FIG. 1A) may comprise means for performing the respective operations of the method 1300. The means may be implemented in any suitable form. For example, the means may be implemented in a circuitry or software module. The second apparatus may be implemented as or included in the second apparatus 120 in FIG. 1A.

In some example embodiments, the second apparatus comprises means for transmitting, to a first apparatus, configuration information indicating a plurality of physical random access channel (PRACH) occasions comprising PRACH occasions in uplink resource and PRACH occasions in sub-band non-overlapping full-duplex (SBFD) resource; means for monitoring, based on the configuration information and for each frequency resource index for frequency multiplexed PRACH occasions, a PRACH transmission with preamble repetitions on a set of PRACH occasions for the PRACH transmission, wherein a starting PRACH occasion of the set is determined from the PRACH occasions in uplink resource, and the PRACH occasions in SBFD resource; and means for receiving, from the first apparatus, the PRACH transmission based at least in part on the starting PRACH occasion of the set.

In some example embodiments, the set is the first set and the first PRACH occasion in uplink resource is determined to be the starting PRACH occasion of the first set.

In some example embodiments, the set is a subsequent set and the configuration information further indicates a first resource offset indicating the number of consecutive PRACH occasions in uplink resource, the second apparatus further comprises: means for monitoring the PRACH transmission on the subsequent set, wherein the starting PRACH occasion of the subsequent set is determined to be a PRACH occasion which is the first PRACH occasion in uplink resource after the first resource offset from a starting PRACH occasion of a previous set.

In some example embodiments, the set is a subsequent set and the configuration information further indicates a second resource offset indicating the number of consecutive PRACH occasions in uplink resource, the second apparatus further comprises: means for monitoring the PRACH transmission on a subsequent set, wherein a starting PRACH occasion of the subsequent set is determined to be a PRACH occasion which is the first PRACH occasion in either uplink resource or SBFD resource after the second resource offset from a starting PRACH occasion of a previous set.

In some example embodiments, the set is a subsequent set and the configuration information further indicates a third resource offset indicating the number of consecutive PRACH occasions in uplink resource, the second apparatus further comprises: means for monitoring the PRACH transmission on the subsequent set, wherein the starting PRACH occasion of the subsequent set is determined to be a PRACH occasion which is the first PRACH occasion in SBFD resource after the third resource offset from a starting PRACH occasion of a previous set.

In some example embodiments, the set is a subsequent set, and a resource offset for the PRACH transmission with preamble repetitions is not configured, the second apparatus further comprises: means for monitoring the PRACH transmission on the subsequent set, wherein the starting PRACH occasion of the subsequent set is determined to be a PRACH occasion which is the first PRACH occasion in uplink resource after PRACH occasions of a previous set.

In some example embodiments, the set is a subsequent set, and a resource offset for the PRACH transmission with preamble repetitions is not configured, the second apparatus further comprises: means for in accordance with a determinization that the number of valid PRACH occasions in SBFD resource after PRACH occasions of a previous set and before PRACH occasions of a next set is sufficient to form a set of PRACH occasions for a PRACH transmission with preamble repetitions, wherein the starting PRACH occasion of the previous set and the starting PRACh occasion of the next set are in uplink resource, monitoring the PRACH transmission on the subsequent set, wherein the starting PRACH occasion of the subsequent set is determined to be a PRACH occasion which is the first PRACH occasion in either uplink resource or SBFD resource after PRACH occasions of a previous set.

In some example embodiments, the set is a subsequent set, and a resource offset for the PRACH transmission with preamble repetitions is not configured the second apparatus further comprises: means for monitoring the PRACH transmission on the subsequent set, wherein the starting PRACH occasion of the subsequent set is determined to be a PRACH occasion which is the first PRACH occasion in SBFD resource after PRACH occasions of a previous set.

In some example embodiments, the second apparatus further comprises: means for in accordance with a determinization that there is at least one PRACH occasion in SBFD resource prior to the first set, monitoring the PRACH transmission on the at least one PRACH occasion in SBFD resource.

In some example embodiments, the second apparatus further comprises: means for in accordance with a determinization that there is at least one candidate starting PRACH occasion in SBFD resource between two consecutive staring PRACH occasions in uplink resource, monitoring at least part of the at least one candidate starting PRACH occasion in SBFD resource for the PRACH transmission with preamble repetitions.

In some example embodiments, the number of candidate starting PRACH occasions to be validated is configured by the second apparatus or pre-defined as a default value.

In some example embodiments, the set is the first set and the first PRACH occasion in SBFD resource is determined to be the starting PRACH occasion of the first set.

In some example embodiments, the second apparatus further comprises: means for monitoring the PRACH transmission on the subsequent set, wherein the starting PRACH occasion of the subsequent set is determined from PRACH occasions in SBFD resource or by skipping the PRACH occasions in uplink resource.

In some example embodiments, the set is: a set of first PRACH occasions determined by skipping the PRACH occasions in SBFD resource or only counting PRACH occasions in uplink resource; or a set of second PRACH occasions determined by skipping the PRACH occasions in uplink resource or only counting PRACH occasions in SBFD resource.

In some example embodiments, the second apparatus further comprises: means for transmitting, to the first apparatus, information about a PRACH occasion mask, wherein the PRACH occasion mask indicating at least one PRACH occasion not allowed to be counted by the first apparatus, and the at least one PRACH occasion comprising at least one of the following: at least one PRACH occasion in uplink resource, or at least one PRACH occasion in SBFD resource.

In some example embodiments, the second apparatus further comprises: means for transmitting to the first apparatus, information about a starting PRACH occasion mask or a bitmap, wherein the starting PRACH occasion mask or the bitmap indicating at least one PRACH occasion not allowed to be validated by the first apparatus.

In some example embodiments, the PRACH transmission is performed during a 4-step random access procedure or a 2-step random access procedure.

In some example embodiments, wherein, a PRACH occasion in uplink resource is a PRACH occasion in uplink symbols, and a PRACH occasion in SBFD resource is a PRACH occasion in SBFD symbols.

In some example embodiments, the first apparatus is or is comprised in terminal device, and the second apparatus is or is comprised in a network device.

FIG. 14 is a simplified block diagram of a device 1400 that is suitable for implementing example embodiments of the present disclosure. The device 1400 may be provided to implement a communication device, for example, the first apparatus 110 or the second apparatus 120 as shown in FIG. 1A. As shown, the device 1400 includes one or more processors 1410, one or more memories 1420 coupled to the processor 1410, and one or more communication modules 1440 coupled to the processor 1410.

The communication module 1440 is for bidirectional communications. The communication module 1440 has one or more communication interfaces to facilitate communication with one or more other modules or devices. The communication interfaces may represent any interface that is necessary for communication with other network elements. In some example embodiments, the communication module 1440 may include at least one antenna.

The processor 1410 may be of any type suitable to the local technical network and may include one or more of the following: general purpose computers, special purpose computers, microprocessors, digital signal processors (DSPs) and processors based on multicore processor architecture, as non-limiting examples. The device 1400 may have multiple processors, such as an application specific integrated circuit chip that is slaved in time to a clock which synchronizes the main processor.

The memory 1420 may include one or more non-volatile memories and one or more volatile memories. Examples of the non-volatile memories include, but are not limited to, a Read Only Memory (ROM) 1424, an electrically programmable read only memory (EPROM), a flash memory, a hard disk, a compact disc (CD), a digital video disk (DVD), an optical disk, a laser disk, and other magnetic storage and/or optical storage. Examples of the volatile memories include, but are not limited to, a random-access memory (RAM) 1422 and other volatile memories that will not last in the power-down duration.

A computer program 1430 includes computer executable instructions that are executed by the associated processor 1410. The instructions of the program 1430 may include instructions for performing operations/acts of some example embodiments of the present disclosure. The program 1430 may be stored in the memory, e.g., the ROM 1424. The processor 1410 may perform any suitable actions and processing by loading the program 1430 into the RAM 1422.

The example embodiments of the present disclosure may be implemented by means of the program 1430 so that the device 1400 may perform any process of the disclosure as discussed with reference to FIG. 8 to FIG. 13. The example embodiments of the present disclosure may also be implemented by hardware or by a combination of software and hardware.

In some example embodiments, the program 1430 may be tangibly contained in a computer readable medium which may be included in the device 1400 (such as in the memory 1420) or other storage devices that are accessible to the device 1400. The device 1400 may load the program 1430 from the computer readable medium to the RAM 1422 for execution. In some example embodiments, the computer readable medium may include any types of non-transitory storage medium, such as ROM, EPROM, a flash memory, a hard disk, CD, DVD, and the like. The term "non-transitory," as used herein, is a limitation of the medium itself (i.e., tangible, not a signal) as opposed to a limitation on data storage persistency (e.g., RAM vs. ROM).

FIG. 15 shows an example of the computer readable medium 1500 which may be in form of CD, DVD or other optical storage disk. The computer readable medium 1500 has the program 1430 stored thereon.

Generally, various embodiments of the present disclosure may be implemented in hardware or special purpose circuits, software, logic or any combination thereof. Some aspects may be implemented in hardware, and other aspects may be implemented in firmware or software which may be executed by a controller, microprocessor or other computing device. Although various aspects of embodiments of the present disclosure are illustrated and described as block diagrams, flowcharts, or using some other pictorial representations, it is to be understood that the block, apparatus, system, technique or method described herein may be implemented in, as non-limiting examples, hardware, software, firmware, special purpose circuits or logic, general purpose hardware or controller or other computing devices, or some combination thereof.

Some example embodiments of the present disclosure also provide at least one computer program product tangibly stored on a computer readable medium, such as a non-transitory computer readable medium. The computer program product includes computer-executable instructions, such as those included in program modules, being executed in a device on a target physical or virtual processor, to carry out any of the methods as described above. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. The program code may be provided to a processor or controller of a general-purpose computer, special purpose computer, or other programmable data processing apparatus, such that the program code, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program code or related data may be carried by any suitable carrier to enable the device, apparatus or processor to perform various processes and operations as described above. Examples of the carrier include a signal, computer readable medium, and the like.

The computer readable medium may be a computer readable signal medium or a computer readable storage medium. A computer readable medium may include but not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random-access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, although operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, although several specific implementation details are contained in the above discussions, these should not be construed as limitations on the scope of the present disclosure, but rather as descriptions of features that may be specific to particular embodiments. Unless explicitly stated, certain features that are described in the context of separate embodiments may also be implemented in combination in a single embodiment. Conversely, unless explicitly stated, various features that are described in the context of a single embodiment may also be implemented in a plurality of embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A first apparatus comprising:
    at least one processor; and
    at least one memory storing instructions that, when executed by the at least one processor, cause the first apparatus at least to:
    receive, from a second apparatus, configuration information indicating a plurality of physical random access channel (PRACH) occasions comprising PRACH occasions in uplink resource and PRACH occasions in sub-band non-overlapping full-duplex (SBFD) resource;
    determine, based on the configuration information, and for each frequency resource index for frequency multiplexed PRACH occasions, a starting PRACH occasion of a set of PRACH occasions for a PRACH transmission with preamble repetitions from the PRACH occasions in uplink resource and the PRACH occasions in SBFD resource, wherein the set of first PRACH occasions is determined by skipping the PRACH occasions in SBFD resource or only by counting the PRACH occasions in uplink resource; or
        wherein a set of second PRACH occasions is determined by skipping the PRACH occasions in uplink resource or only by counting the PRACH occasions in SBFD resource; and
        perform, to the second apparatus, the PRACH transmission based at least in part on the starting PRACH occasion of the set.

2. The first apparatus of claim 1, wherein the set is a first set and a first PRACH occasion in uplink resource is determined to be a starting PRACH occasion of the first set.

3. The first apparatus of claim 1, wherein the set is a subsequent set, and the configuration information further indicates a first resource offset indicating the number of consecutive PRACH occasions in uplink resource,
    and wherein the first apparatus is further caused to:
        determine a PRACH occasion as a starting PRACH occasion of the subsequent set, wherein the PRACH occasion is a first PRACH occasion in uplink resource after the first resource offset from a starting PRACH occasion of a previous set.

4. The first apparatus of claim 1, wherein the set is a subsequent set, and the configuration information further indicates a second resource offset indicating the number of consecutive PRACH occasions in SBFD resource,
    and wherein the first apparatus is further caused to:
        determine a PRACH occasion as a starting PRACH occasion of the subsequent set, wherein the PRACH occasion is a first PRACH occasion in SBFD resource after the second resource offset from a starting PRACH occasion of a previous set.

5. The first apparatus of claim 1, wherein the set is a subsequent set, and a resource offset for the PRACH transmission with preamble repetitions is not configured,
    and wherein the first apparatus is further caused to:
        determine a PRACH occasion as a starting PRACH occasion of the subsequent set, wherein the PRACH occasion is a first PRACH occasion in uplink resource after PRACH occasions of a previous set.

6. The first apparatus of claim 1, wherein the set is a subsequent set, and a resource offset for the PRACH transmission with preamble repetitions is not configured,
    and wherein the first apparatus is further caused to:
        determine a PRACH occasion as a starting PRACH occasion of the subsequent set, wherein the PRACH occasion is a first PRACH occasion in SBFD resource after PRACH occasions of a previous set.

7. The first apparatus of claim 1, wherein the set is a subsequent set, and the first apparatus is further caused to:
    determine a starting PRACH occasion of the subsequent set from PRACH occasions in SBFD resource by skipping the PRACH occasions in uplink resource.

8. The first apparatus of claim 1, wherein the first apparatus is further caused to:
receive, from the second apparatus, information about a PRACH occasion mask, wherein the PRACH occasion mask indicating at least one PRACH occasion not allowed to be counted by the first apparatus, and the at least one PRACH occasion comprising at least one of the following: at least one PRACH occasion in uplink resource, or at least one PRACH occasion in SBFD resource; and
apply the PRACH occasion mask prior to determining a starting PRACH occasion of the set.

9. The first apparatus of claim 1, wherein the first apparatus is further caused to:
receive, from the second apparatus, information about a starting PRACH occasion mask or a bitmap, wherein the starting PRACH occasion mask or the bitmap indicating at least one PRACH occasion not allowed to be validated by the first apparatus;
determine at least one candidate starting PRACH occasion; and
determine, at least based on the starting PRACH occasion mask or the bitmap, a starting PRACH occasion of the set from the at least one candidate starting PRACH occasion.

10. A second apparatus comprising:
at least one processor; and
at least one memory storing instructions that, when executed by the at least one processor, cause the second apparatus at least to:
transmit, to a first apparatus, configuration information indicating a plurality of physical random access channel (PRACH) occasions comprising PRACH occasions in uplink resource and PRACH occasions in sub-band non-overlapping full-duplex (SBFD) resource;
monitor, based on the configuration information and for each frequency resource index for frequency multiplexed PRACH occasions, a PRACH transmission with preamble repetitions on a set of PRACH occasions for the PRACH transmission, wherein a starting PRACH occasion of the set is determined from the PRACH occasions in uplink resource, and the PRACH occasions in SBFD resource, wherein the set of first PRACH occasions is determined by skipping the PRACH occasions in SBFD resource or only by counting the PRACH occasions in uplink resource; or
wherein a set of second PRACH occasions is determined by skipping the PRACH occasions in uplink resource or only by counting the PRACH occasions in SBFD resource; and
receive, from the first apparatus, the PRACH transmission based at least in part on the starting PRACH occasion of the set.

11. The second apparatus of claim 10, wherein the set is a first set and a first PRACH occasion in uplink resource is determined to be a starting PRACH occasion of the first set.

12. The second apparatus of claim 10, wherein the set is a subsequent set and the configuration information further indicates a first resource offset indicating the number of consecutive PRACH occasions in uplink resource,
and wherein the second apparatus is further caused to:
monitor the PRACH transmission on the subsequent set, wherein a starting PRACH occasion of the subsequent set is determined to be a PRACH occasion which is a first PRACH occasion in uplink resource after the first resource offset from a starting PRACH occasion of a previous set.

13. The second apparatus of claim 10, wherein the set is a subsequent set, and the configuration information further indicates a second resource offset indicating the number of consecutive PRACH occasions in uplink resource and SBFD resource,
and wherein the second apparatus is further caused to:
monitor the PRACH transmission on the subsequent set, wherein a starting PRACH occasion of the subsequent set is determined to be a PRACH occasion which is a first PRACH occasion in either uplink resource or SBFD resource after the second resource offset from a starting PRACH occasion of a previous set.

14. The second apparatus of claim 10, wherein the set is a subsequent set, and the configuration information further indicates a third resource offset indicating the number of consecutive PRACH occasions in SBFD resource,
and wherein the second apparatus is further caused to:
monitor the PRACH transmission on the subsequent set, wherein a starting PRACH occasion of the subsequent set is determined to be a PRACH occasion which is a first PRACH occasion in SBFD resource after the third resource offset from a starting PRACH occasion of a previous set.

15. The second apparatus of claim 10, wherein the set is a subsequent set and the second apparatus is further caused to:
monitor the PRACH transmission on the subsequent set, wherein a starting PRACH occasion of the subsequent set is determined from PRACH occasions in SBFD resource or by skipping the PRACH occasions in uplink resource.

16. The second apparatus of claim 10, the set is:
a set of first PRACH occasions determined by skipping the PRACH occasions in SBFD resource or only counting the PRACH occasions in uplink resource; or
a set of second PRACH occasions determined by skipping the PRACH occasions in uplink resource or only counting the PRACH occasions in SBFD resource.

17. The second apparatus of claim 10, wherein the second apparatus is further caused to:
transmit, to the first apparatus, information about a PRACH occasion mask, wherein the PRACH occasion mask indicating at least one PRACH occasion not allowed to be counted by the first apparatus, and the at least one PRACH occasion comprising at least one of the following: at least one PRACH occasion in uplink resource, or at least one PRACH occasion in SBFD resource.

18. The second apparatus of claim 10, wherein the second apparatus is further caused to:
transmit, to the first apparatus, information about a starting PRACH occasion mask or a bitmap, wherein the starting PRACH occasion mask or the bitmap indicating at least one PRACH occasion not allowed to be validated by the first apparatus.

19. A method comprising:
receiving, at a first apparatus and from a second apparatus, configuration information indicating a plurality of physical random access channel (PRACH) occasions comprising PRACH occasions in uplink resource and PRACH occasions in sub-band non-overlapping full-duplex (SBFD) resource;
determining, based on the configuration information, and for each frequency resource index for frequency multiplexed PRACH occasions, a starting PRACH occasion of a set of PRACH occasions for a PRACH transmission with preamble repetitions from the PRACH occasions in uplink resource and the PRACH occasions in SBFD resource, wherein the set of first PRACH occasions is determined by skipping the PRACH occasions in SBFD resource or only by counting the PRACH occasions in uplink resource, or wherein a set of second PRACH occasions is determined by skipping the PRACH occasions in uplink resource or only by counting the PRACH occasions in SBFD resource; and performing, to the second apparatus, the PRACH transmission based at least in part on the starting PRACH occasion of the set.

* * * * *